United States Patent
Dick et al.

(10) Patent No.: US 11,938,982 B2
(45) Date of Patent: Mar. 26, 2024

(54) SYSTEMS AND METHODS FOR INSPECTING A RAILROAD

(71) Applicant: Ensco, Inc., Springfield, VA (US)

(72) Inventors: Matthew Dick, Charlottesville, VA (US); David Ford, Fairfax, VA (US); Zhipeng Liu, Great Falls, VA (US); Samson Yilma, Arlington, VA (US)

(73) Assignee: Ensco, Inc., Springfield, VA (US)

( * ) Notice: Subject to any disclaimer, the term of this patent is extended or adjusted under 35 U.S.C. 154(b) by 0 days.

(21) Appl. No.: 18/055,010

(22) Filed: Nov. 14, 2022

(65) Prior Publication Data

US 2023/0071611 A1   Mar. 9, 2023

Related U.S. Application Data

(63) Continuation of application No. 16/774,263, filed on Jan. 28, 2020, now Pat. No. 11,529,980.
(Continued)

(51) Int. Cl.
*B61L 23/04* (2006.01)
*B61K 9/10* (2006.01)
(Continued)

(52) U.S. Cl.
CPC .............. *B61L 23/042* (2013.01); *B61K 9/10* (2013.01); *B61L 23/048* (2013.01); *G06T 7/40* (2013.01);
(Continued)

(58) Field of Classification Search
CPC .... B61L 23/042; B61L 23/048; B61L 23/047; B61K 9/10; B61K 9/08; G06T 7/40;
(Continued)

(56) References Cited

U.S. PATENT DOCUMENTS

| 1,601,080 A | 9/1926 | Otis |
| 3,562,419 A | 2/1971 | Stewart |

(Continued)

FOREIGN PATENT DOCUMENTS

| EP | 1186509 B1 * | 2/2006 | ............... B61K 9/08 |
| EP | 1186509 B1 | 2/2006 | |

(Continued)

OTHER PUBLICATIONS

Stuart, Cameron, Autonomous Track Geometry Measurement System, USDOT Apr. 24, 2017.*
Rail Vision Europe Ltd. "Track Diagnostics," Web page, <http://www.rail-vision.co.uk/track_diagnostics>, retrieved from Internet on Jul. 6, 2020 (29 pages).
(Continued)

*Primary Examiner* — Zhitong Chen
(74) *Attorney, Agent, or Firm* — Nixon Peabody LLP

(57) ABSTRACT

A method for analyzing one or more conditions of a transportation pathway includes obtaining, using an imaging device of an inspection system, image data reproducible as a plurality of images of the transportation pathway, each of the plurality of images being reproducible as an image of a portion of the transportation pathway, each portion of the transportation pathway having an associated location along a length of the transportation pathway, analyzing, using one or more processors of the inspection system, the image data to determine a first plurality of metrics indicative of a condition of the transportation pathway at each of the associated locations, and generating a first graph, using the determined first plurality of metrics, that is indicative of the condition of the transportation pathway at each of the associated locations.

20 Claims, 7 Drawing Sheets

Related U.S. Application Data

(60) Provisional application No. 62/799,033, filed on Jan. 30, 2019.

(51) Int. Cl.
| | | |
|---|---|---|
| *G06T 7/40* | (2017.01) | |
| *G06T 7/80* | (2017.01) | |
| *G06T 7/90* | (2017.01) | |
| *G06V 10/25* | (2022.01) | |
| *G06V 10/426* | (2022.01) | |
| *G06V 20/10* | (2022.01) | |

(52) U.S. Cl.
CPC .................. *G06T 7/80* (2017.01); *G06T 7/90* (2017.01); *G06V 10/25* (2022.01); *G06V 10/426* (2022.01); *G06V 20/176* (2022.01); *G06V 20/188* (2022.01)

(58) Field of Classification Search
CPC ............. G06T 7/80; G06T 7/90; G06V 10/25; G06V 10/426; G06V 20/176; G06V 20/188
See application file for complete search history.

(56) References Cited

U.S. PATENT DOCUMENTS

| | | | |
|---|---|---|---|
| 4,915,504 | A | 4/1990 | Thurston |
| 5,636,026 | A | 6/1997 | Mian |
| 6,064,428 | A | 5/2000 | Trosino |
| 6,356,299 | B1* | 3/2002 | Trosino ................ B61L 23/048 348/148 |
| 6,532,038 | B1 | 3/2003 | Haring |
| 6,594,591 | B2 | 7/2003 | Clark |
| 6,600,999 | B2 | 7/2003 | Clark |
| 8,958,079 | B2 | 2/2015 | Kainer |
| 2007/0217670 | A1 | 9/2007 | Bar-Am |
| 2009/0319197 | A1 | 12/2009 | Villar |
| 2014/0314276 | A1* | 10/2014 | Wexler ................ G06T 3/0012 382/103 |
| 2016/0121912 | A1* | 5/2016 | Puttagunta ............ B61L 27/04 701/19 |
| 2016/0207551 | A1 | 7/2016 | Mesher |
| 2017/0106885 | A1* | 4/2017 | Singh ..................... G01B 11/22 |
| 2018/0339720 | A1 | 11/2018 | Singh |
| 2020/0101989 | A1 | 4/2020 | Dick |
| 2020/0156676 | A1* | 5/2020 | Chung ................ B61L 23/045 |

FOREIGN PATENT DOCUMENTS

| | | |
|---|---|---|
| EP | 3 138 754 A1 | 3/2017 |
| WO | WO 2006/004846 A2 | 1/2006 |
| WO | WO 2014/163864 A1 | 10/2014 |
| WO | WO 2019/023658 A1 | 1/2019 |

OTHER PUBLICATIONS

NX Gen Rail, "NXTrack," Web page, <https://nxgenrail.com/nxtrack/nxtrack/>, retrieved from Internet on Jul. 6, 2020 (12 pages).

Mermec Group, "Head Check—Head Check Detection," Web page <http://www.mermecgroup.com/inspect/track-inpsection/64/head-check.php>, retrieved from Internet on Jul. 7, 2020 (2 pages).

Mermec Group, "Track Inspection—V-CUBE," Web page <http://www.mermecgroup.com/inspect/track-inspection/S24/track-inspection-v-cube.php>, retrieved from Internet on Jul. 7, 2020 (2 pages).

Mermec Group, "Fishplate/Joint Bar Inspection," Web page <http://www.mermecgroup.com/inspect/track-inspection/65/fishplate--joint-bar.php>, retrieved from Internet on Jul. 7, 2020 (2 pages).

Mermec Group, "Internal Rail Flaw—Ultrasonic Inspection," Web page <http://www.mermecgroup.com/inspect/track-inspection/1020/internal-rail-flaw.php>, retrieved from Internet on Jul. 7, 2020 (2 pages).

KLD Labs, "Rail Surface Evaluation," Web page <http://www.kldlabs.com/?page_id=63>, 2018, retrieved from Internet on Jul. 7, 2020 (2 pages).

KLD Labs, "Rail Profile Measurement," Web page, <http://www.kldlabs.com/?page_id=64>, 2018, retrieved from Internet on Jul. 7, 2020 (2 pages).

KLD Labs, "Third Rail Monitoring," Web page <http://www.kldlabs.com/?page_id=67>, 2018, retrieved from Internet on Jul. 7, 2020 (2 pages).

KLD Labs, "Rail Grinding Assessment," Web page <http://www.kldlabs.com/?page_id=130>, 2018, retrieved from Internet on Jul. 7, 2020 (2 pages).

Omnicom Balfour Beatty, "Product Overview," Web page, <https://omnicombalfourbeatty.com/>, retrieved from Internet on Jul. 6, 2020 (12 pages)

Beena Vision, "Products," Web page, <https://beenavision.com/products.html>, retrieved from Internet on Jul. 6, 2020 (6 pages).

Beena Vision, "Trimble Been Vision Solutions," 2018, retrieved from <https://beenavision.com/Brochure_2018_V2/index.php#p=1> on Jul. 8, 2020 (96 pages).

Saadat et al. "Development of Autonomous Track Geometry Measurement Technology," ENSCO, Inc., Aug. 30, 2015 (311 pages).

International Search Report and Written Opinion in International Application No. PCT/US2018/044149, dated Nov. 19, 2018 (11 pages).

International Search Report and Written Opinion in International Application No. PCT/US2018/044212, dated Nov. 19, 2018 (12 pages).

Extended European Search Report in European Patent Application No. EP 20154553.0, dated Jul. 7, 2020 (12 pages).

Shangguan, P. and Al-Qadi, I.L. 2014. Content-based image retrieval approaches to interpret ground penetrating radar data. Construction and Building Materials, 69, pp. 10-17.

Prasongpongchai, T., Chalidabhongse, T.H. and Leelhapantu, S. Sep. 2017. A vision-based method for the detection of missing rail fasteners. In 2017 IEEE International Conference on Signal and Image Processing Applications (ICSIPA) (pp. 419-424). IEEE.

\* cited by examiner

SYSTEMS AND METHODS FOR INSPECTING A RAILROAD

CROSS-REFERENCE TO RELATED APPLICATIONS

This application is a continuation of U.S. patent application Ser. No. 16/774,263, filed Jan. 28, 2020, now allowed, which claims the benefit of and priority to U.S. Provisional Application No. 62/799,033, filed Jan. 30, 2019, each of which is hereby incorporated by reference herein in its entirety.

TECHNICAL FIELD

The present disclosure relates generally to inspection systems, and more particularly, to systems and methods for inspecting a railroad or a roadway.

BACKGROUND

Transportation pathways such as railroads and roadways are often inspected to identify various conditions (e.g., defects) that may require maintenance or repair. Inspection systems often utilize a camera located on a moving transport device that captures images of a given length of the railroad or roadway (e.g., several miles). However, reviewing each of the captured images to identify the various conditions can be extremely time consuming and inefficient. Similarly, it is impracticable or difficult to transmit each of the captured images from the transport device to a remote device for analysis and/or viewing in substantially real-time. The present disclosure is directed to solving these and other problems.

SUMMARY

According to some implementations of the present disclosure, a method for analyzing one or more conditions of a transportation pathway includes obtaining, using an imaging device of an inspection system, image data reproducible as a plurality of images of the transportation pathway, each of the plurality of images being reproducible as an image of a portion of the transportation pathway, each portion of the transportation pathway having an associated location along a length of the transportation pathway, analyzing, using one or more processors of the inspection system, the image data to determine a first plurality of metrics indicative of a condition of the transportation pathway at each of the associated locations, and generating a first graph, using the determined first plurality of metrics, that is indicative of the condition of the transportation pathway at each of the associated locations.

According to some implementations of the present disclosure, a method for analyzing ballast of a railroad includes obtaining, using an imaging device of an inspection system, image data reproducible as a plurality of images of the railroad, each of the plurality of images being reproducible as an image of a portion of the railroad, each portion of the railroad having an associated location along a length of the railroad, determining a plurality of metrics by analyzing, using one or more processors of the inspection system, the image data, the plurality of metrics being indicative of a condition of the ballast of the railroad at each of the associated locations; and generating a graph using at least a portion of the determined plurality of metrics for visually illustrating the condition of the ballast of the railroad for at least a portion of the associated locations.

According to some implementations of the present disclosure, a method for analyzing cross-ties of a railroad includes obtaining, using an imaging device of an inspection system, image data reproducible as a plurality of images of the railroad, each of the plurality of images being reproducible as an image of a portion the railroad, each portion of the railroad having an associated location along a length of the railroad, determining a plurality of metrics by analyzing, using one or more processors of the inspection system, the image data, the plurality of metrics being indicative of a condition of the cross-ties of the railroad at each of the associated locations, and generating a graph using at least a portion of the determined plurality of metrics for visually illustrating the condition of the cross-ties of the railroad for at least a portion of the associated locations.

According to some implementations of the present disclosure, a method for analyzing the presence or absence of one or more components of a railroad includes obtaining, using an imaging device of an inspection system, image data reproducible as a plurality of images of the railroad, each of the plurality of images being reproducible as an image of a portion the railroad, each portion of the railroad having an associated location along a length of the railroad, determining a plurality of metrics by analyzing, using one or more processors of the inspection system, the image data, the plurality of metrics being indicative of the presence or absence of a component of the railroad at each of the associated locations, and generating a graph using at least a portion of the determined plurality of metrics for visually illustrating the presence or absence of the component of the railroad at each of the associated locations.

According to some implementations of the present disclosure, a method for analyzing a conductive rail cover for one or more conductor rails of a railroad includes obtaining, using an imaging device of an inspection system, image data reproducible as a plurality of images of the railroad, each of the plurality of images being reproducible as an image of a portion the railroad, each portion of the railroad having an associated location along a length of the railroad, determining a plurality of metrics by analyzing, using one or more processors of the inspection system, the image data, the plurality of metrics being indicative of a distance between a surface of the one or more conductor rails and the conductor rail cover at each of the associated locations, and generating a graph using at least a portion of the determined plurality of metrics for visually illustrating the distance at each of the associated locations.

According to some implementations of the present disclosure, a method for analyzing drainage of a railroad track includes obtaining, using an imaging device of an inspection system, image data reproducible as a plurality of images of the railroad track, each of the plurality of images being reproducible as an image of a portion the railroad track, each portion of the railroad having an associated location along a length of the railroad track, determining a plurality of metrics by analyzing, using one or more processors of the inspection system, the image data, the plurality of metrics being indicative of a drainage condition of the railroad track, and generating a graph using at least a portion of the determined plurality of metrics for visually illustrating the drainage condition at each of the associated locations.

According to some implementations of the present disclosure, a method for analyzing vegetation within a right-of-way of a railroad includes obtaining, using an imaging device of an inspection system, image data reproducible as a plurality of images of the railroad, each of the plurality of images being reproducible as an image of a portion the railroad, each portion of the railroad having an associated location along a length of the railroad, determining a plurality of metrics by analyzing, using one or more processors of the inspection system, the image data, the plurality of metrics being indicative of a condition of vegetation within the right-of-way of the railroad at each of the associated locations, and generating a graph using at least a portion of the determined plurality of metrics for visually illustrating the condition of the vegetation within the right-of-way of the railroad at each of the associated locations.

According to some implementations of the present disclosure, a method for analyzing one or more conditions of a transportation pathway includes obtaining, during a first inspection of the transportation pathway at a first time image data reproducible as a plurality of images of the transportation pathway, each of the plurality of images being reproducible as an image of a portion of the transportation pathway, each portion of the transportation pathway having an associated location along a length of the transportation pathway, determining a first plurality of metrics by analyzing the image data, the first plurality of metrics being indicative of a first condition of the transportation pathway at each of the associated locations at the first time, displaying a first graph, using at least a portion of the determined first plurality of metrics, to visually illustrate the first condition of the transportation pathway at each of the associated locations at the first time; and displaying a second graph, using at least a portion of a second plurality of metrics, to visually illustrate the first condition of the transportation pathway at each of the associated locations at a second time that is different from the first time.

According to some implementations of the present disclosure, a method for analyzing one or more conditions of a railroad including obtaining, using an imaging device, image data reproducible as a plurality of images of the railroad, each of the plurality of images being reproducible as an image of a portion of the railroad, each portion of the railroad having an associated location along a length of the railroad; analyzing, using one or more processors, the image data to determine (i) a first plurality of metrics indicative of a first condition of the railroad at each of the associated locations and (ii) a second plurality of metrics indicative of a second condition of the railroad at each of the associated locations; displaying, on a display device, a first graph, using at least a portion of the first plurality of metrics, to visually illustrate the first condition of the railroad; and displaying, on the display device, a second graph, using at least a portion of the second plurality of metrics, to visually illustrate the second condition of the railroad, the second graph being displayed adjacent to the first graph on the display device at the same time.

According to some implementations of the present disclosure, a system for inspecting a transportation pathway includes an imaging device; and a memory device storing machine readable instructions configured to be executed by one or more processors to cause the system to: cause the imaging device to generate first image data reproducible as a first image of a first portion of the transportation pathway at a first location; analyze the first image data to determine a first metric indicative of a condition for the first portion of the transportation pathway; cause the imaging device to generate second image data reproducible as a second image of a second portion of the transportation pathway at a second location that is a predetermined distance from the first location; analyze the second image data to determine a second metric indicative of the condition for the second portion of the transportation pathway; and generate a graph, using the first metric and the second metric, that is indicative of the condition at the first location and the second location.

The above summary is not intended to represent each embodiment or every aspect of the present invention. Additional features and benefits of the present invention are apparent from the detailed description and figures set forth below.

Figure 1:
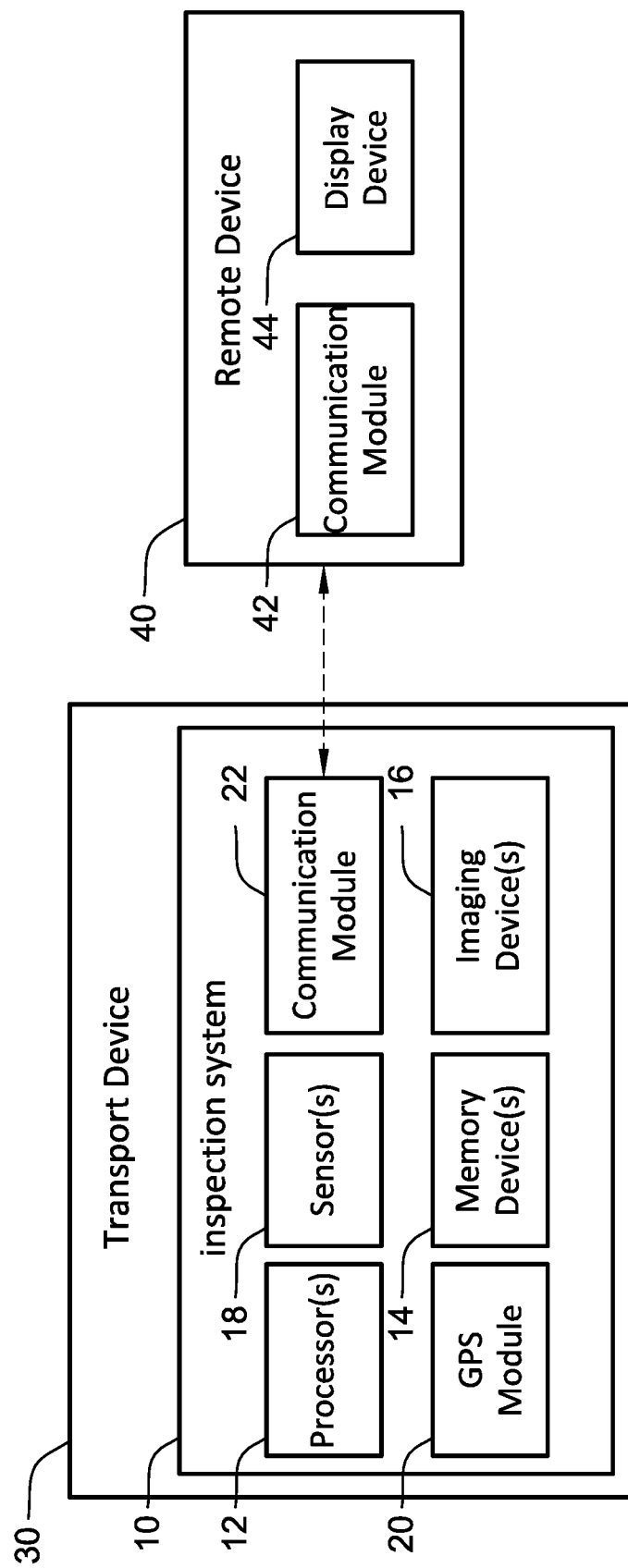
FIG. 1 is a functional block diagram of an inspection system, according to some implementations of the present disclosure.

While the disclosure is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Referring to FIG. 1, an inspection system 10 includes one or more processors 12 (hereinafter, "processor"), one or more memory devices 14 (hereinafter, "memory device"), one or more imaging devices 16, one or more sensors 18, a GPS module 20, and a communication module 22. The inspection system 10 is coupled to a transport device 30 and is generally used to inspect a transportation pathway (e.g., a railroad or a roadway), determine metric indicative of one or more conditions of the transportation pathway, generate one or more graphs indicative of the one or more conditions, and transmit the graph(s) to a remote system 40 so that they can be displayed and viewed/analyzed by a user.

The transport device 30 is moveable along the transportation pathway. In some implementations, the transport device 30 is autonomous, meaning that it can be operated with little or no human intervention. In other implementations, the transport device 30 is manually operated by a user that is located on the transport device 30 or remotely controlled by a user that is not located on the transport device 30. In the case of a railroad, the transport device 30 can be a locomotive, a railcar, a passenger car, a freight car, a tram, a subway car, a railroad vehicle, a road vehicle (e.g., a vehicle configured to operate on both a railroad and a roadway, etc.) In the case of a roadway, the transport device 30 can be a car, a truck, a bus, a motorcycle, an autonomous vehicle, or the like. Further, in some implementation, the transport device 30 can be an aerial vehicle (e.g., an unmanned aerial vehicle) configured to fly over the transportation pathway (e.g., railroad or roadway) at a predetermined altitude.

The processor 12 of the inspection system 10 is communicatively coupled to the memory device 14, the camera 16, the sensors 18, the GPS module 20, and the communication module 22, and is generally used to control the operation of these components of the system 10 and implement the methods described herein. The memory device 14 is generally used to store machine readable instructions that are executable by the processor 12. Generally, the memory device 14 can be any suitable computer readable storage device or media, such as, for example, a random or serial access memory device, a hard drive, a solid state drive, a flash memory device, etc.

The imaging device(s) 16 are generally used to generate image data reproducible as one or more images of the transportation pathway. That is, as the transport device 30 moves along the transportation pathway (e.g., railroad or roadway), the imaging device(s) 16 continuously generate image data. In some implementations, the imaging device(s) 16 are configured to only generate image data responsive to movement of the transport device 30 and are configured to cease generating image data when the transport device 30 stops moving. In some implementations, the imaging device(s) 16 also include one or more light sources to illuminate the transportation pathway (e.g., in a tunnel) and aid in generating image data (e.g., fluorescent bulbs, incandescent bulbs, light emitting diodes (LEDs), arc lamps, flashtubes, etc.).

The imaging device(s) 16 can be coupled at various locations on the transport device 30 to capture image data of different portions of the transportation pathway. In some implementations, the imaging device(s) 16 are coupled to an underside of the transport device 30 such that the captured image data is reproducible as a plurality of images showing a plan or top view of the transportation pathway. For example, referring to FIG. 2, in such implementations, the imaging device(s) 16 can capture images of a railroad 200 including a first running rail 210A, a second running rail 210B, a first cross-tie 212A, a second cross-tie 212B, and ballast 214. As described in further detail herein, the imaging device(s) 16 can capture a plurality of such images of the railroad 200 like the one shown in FIG. 2, each of which is associated with a location along the railroad 200 and analyzed to determine a metric indicative of a condition of the railroad 200 (e.g., a condition of the ballast 214, a condition of the running rail 210A, a second of the running rail 210B, a condition of the first cross-tie 212A, a condition of the second cross-tie 212B, or any combination thereof).

In some implementations, the imaging device(s) 16 can be coupled to the transport device 30 such that a field of view of the imaging device(s) is generally perpendicular to the direction of travel of the transport device 30. For example, referring to FIG. 3, in such implementations, the imaging device(s) 16 can capture images of a railroad includes a conductive rail 310 (a/k/a power rail or third rail) and a conductive rail cover 316. The conductive rail 310 is an electrified rail (e.g., to provide power to a subway car) that is positioned on top of an insulator 312. Brackets 314 position cover 316 such that it at least partially overlies an upper surface of the conductor rail 310, aiding in protecting the conductor rail 310 from damage (e.g., rain, sun, debris, etc.) and inadvertent contact. As described in further detail herein, the imaging device(s) 16 can capture images like the one shown in FIG. 3, each of which is associated with a location along the railroad and analyzed to determine a metric indicative of a condition of the railroad (e.g., a distance d between the conductive rail cover 316 and a surface of the conductive rail 310).

In other implementations, one or more of the imaging device(s) 16 can be coupled to a front or leading portion of the transport device 30 such that a field of view of the imaging device(s) 16 is directed in the same direction as the direction of travel of the transport device 30. That is, the imaging device(s) 16 can capture images of a right-of-way of the railroad. State another way, the imaging device(s) 16 capture images of what a railroad engineer would see if operating the transport device 30. The right-of-way generally includes the railroad track, including its rails, cross-ties (a/k/a ties or sleepers), and ballast, and an area on either side of the rails (e.g., 2 feet, 5 feet, ten feet, etc.) For example, referring to FIG. 4, in such implementations, the imaging device(s) 16 can capture images of a railroad 400 including a first running rail 410A, a second running rail 410B, cross-ties 412, ballast 414, and vegetation 416. As described in further detail herein, the imaging device(s) 16 can capture images of the railroad 400 like the one shown in FIG. 4, each of which is associated with a location along the railroad 400 and analyzed to determine a metric indicative of a condition of the railroad 400 (e.g., a vegetation condition).

The imaging device(s) 16 of the inspection system 10 (FIG. 1) described herein can include a visual imaging device (e.g., digital cameras, line-scan cameras, frame cameras, photodiodes, photomultiplier tube arrays, charge-coupled devices (CCDs)), a thermal imaging device (e.g., a thermographic camera configured to detect infrared radiation), or both. The visual imaging device is configured to generate visual image data (e.g., still images, video images, or both) that is reproducible as one or more visual images of the transportation pathway. Thermal imaging devices are configured to generate thermal image data reproducible as one or more thermal images of the transportation pathway. The amount of infrared radiation emitted from an object or surface increases with temperature, thus, the detected infrared radiation is indicative of a temperature. The thermal imaging device can detect temperatures ranging between, for example, about −50° C. and about 2,000° C., 0° C. to about 1,000° C., 20° C. to about 50° C., etc. In some implementations, a user can select the range of temperatures that are detected by the thermal imaging device. The thermal data obtained by the thermal imaging device is reproducible as one or more thermal images comprising a range of colors, where each color is indicative of a temperature and/or a range of temperatures. For example, violet (which has the lowest wavelength on the visible light spectrum) can be indicative of the coldest temperature in the temperature image and red (which has the highest wavelength on the visible light spectrum) can be indicative of the hottest temperature within the thermal image, with shades of violet, blue, green, yellow, orange, and red being indicative of temperatures therebetween. Generally, a user can select the range of colors and/or range of temperatures (e.g., the maximum and minimum temperatures) to make temperature differences within the thermal image more distinctive and readily apparent.

The sensors 18 of the inspection system 10 can include a variety of sensors, such as, for example, an optical sensor, a radar-based sensor, an RFID reader, or any combination thereof. The optical sensor is configured to detect movement of the transport device 30 along the transportation pathway and can include an optical encoder that detects rotational position changes and converts the angular position or motion to analog or digital signal outputs. The optical sensor can also determine a distance traveled by the transport device 30 from an initial position. In some implementations, the processor 12 automatically actuates the camera(s) 16 responsive to receiving signals or data from the optical sensor indicating that the transport device 30 is moving. The radar-based sensor can be a light detection and ranging ("LIDAR") sensor, a simultaneous localization and mapping ("SLAM") sensor, or both. The LIDAR sensor and/or SLAM sensor can be used to generate a three-dimensional representation of the transportation pathway and its surroundings, which can be stored in the memory device 14 and/or transmitted to a remote device via the communication module 22. The RFID reader is configured to automatically receive location information (e.g., in terms of GPS coordinates, a milepost or mile marker, landmarks, etc.) from RFID tags positioned on or adjacent to the transportation pathway (e.g., RFID tags coupled to a running rail of the railroad). Thus, the RFID reader can aid in determining the location of the transport device 30 if the location cannot be determined from the GPS module 20.

The GPS module 20 (e.g., sensor) of the inspection system 10 is configured to receive GPS signals for determining a location (e.g., latitude and longitude, or other coordinates) of the transport device 30. The current location of the transport device 30 can be expressed in terms of a distance along the railroad. For example, using the GPS module 20, it can be determined that the transport device 30 is located at meter 400 of the transportation pathway. Alternatively, the current location of the transport device 30 can be expressed in terms of a distance traveled from an initial position, as determined by the GPS module 20.

The communication module 22 of the inspection system 10 is configured to communication with a communication module 42 of the remote system 40. Examples of communication interfaces for the communication module 22 include a wired network interface or a wireless network interface. As described herein, the communication module 22 can transmit certain data in substantially real-time to the communication module 42 of the remote system 40. The communication module 22 can include, for example, an antenna, a receiver, a transmitter, a transceiver, or any combination thereof.

While the inspection system 10 is shown in FIG. 1 as including all of the components described herein, more or fewer components can be included in a system. For example, an alternative system (not shown) includes the processor 12, the memory device 14, the imaging device 16, the GPS module 20, and the communication module 22. Thus, various inspection systems can be formed using any portion of the components described herein.

As shown in FIG. 1, unlike the inspection system 10, the remote system 40 is not coupled to the transport device 30. That is, the remote system 40 is not physically located on (e.g., coupled to) the transport device 30. The remote system 40 can be a computer, a laptop, a tablet, a smartphone, a server, or the like. Thus, a user can view the information displayed on the display device 44 without being physically located on the transport device 30.

The display device 44 of the remote system 40 is a human-machine interface (HMI) including a graphical user interface (GUI) that can display images (e.g., still images, video images, or both). As described in detail herein, the display device 44 can display, for example, graphs indicative of determined metrics. The display device 44 can be, for example, a general or special purpose desktop computer, laptop computer, tablet computer, smartphone, display monitor, television, LED display, LCD display, or the like, or any combination thereof. The display device 44 can also include an input interface such as, for example, a touch-screen or touch-sensitive substrate, a mouse, a keyboard, or any sensor system configured to sense inputs made by a human user interacting with the display device 44. In some implementations, the inspection system 10 also includes a display device that is the same as, or similar to, the display device 44 described herein.

In addition to or in the alternative to the inspection system 10, other inspection systems can be coupled to the transport device 30 and used to implement the methods described herein. Exemplary alternative inspection systems are described in commonly owned International Patent Application Publication No. WO 2019/023658 entitled "Systems and Methods for Visualizing and Analyzing a Rail Surface," co-pending U.S. patent application Ser. No. 16/584,946 entitled "Systems and Methods for Analyzing Thermal Properties of Railroad," and co-pending U.S. patent application Ser. No. 16/705,137 entitled "Systems and Methods for Analyzing a Rail, each which is hereby incorporated by reference herein in its entirety. Each of the elements or aspects of the inspection system 10 can be substituted or modified with any of the elements and/or functions described in these applications.

Figure 2:
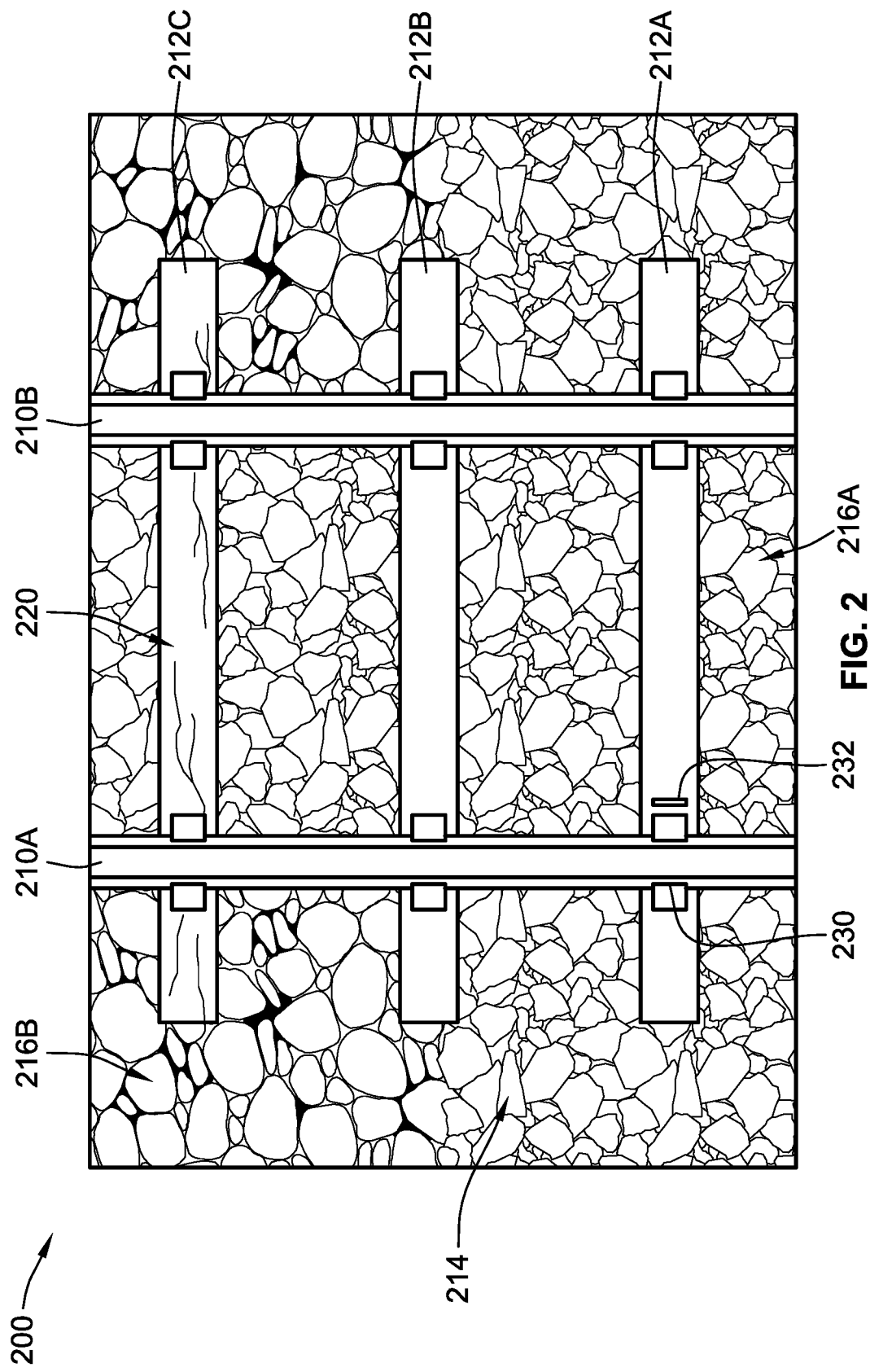
FIG. 2 is an image of a portion of a railroad including running rails, cross-ties, and ballast, according to some implementations of the present disclosure.
Figure 4:
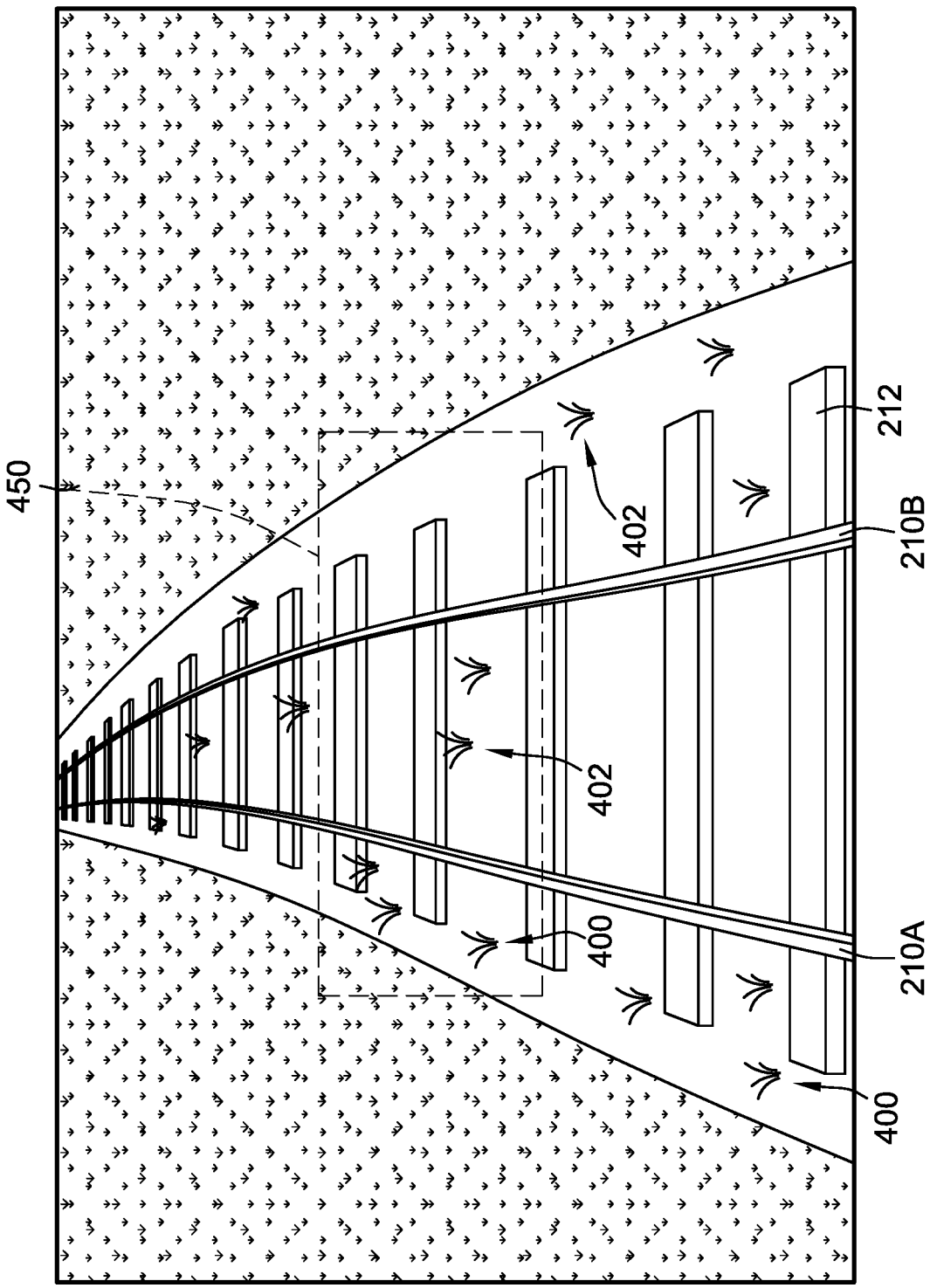
FIG. 4 is an image of a portion of a railroad including running rails, cross-ties, and vegetation, according to some implementations of the present disclosure.

Further, in some implementations, the methods described herein can be implemented using two or more different inspection systems located on the same transport device. For example, in some implementations, a field of view of an imaging device of a first inspection system coupled to the transport device can be directed downwards towards a top surface of railroad (e.g., as shown in FIG. 2) and a field of view of an imaging device of a second inspection system can be directed forward or backwards relative to the direction of travel of the transport device (e.g., as shown in FIG. 4).

Figure 5:
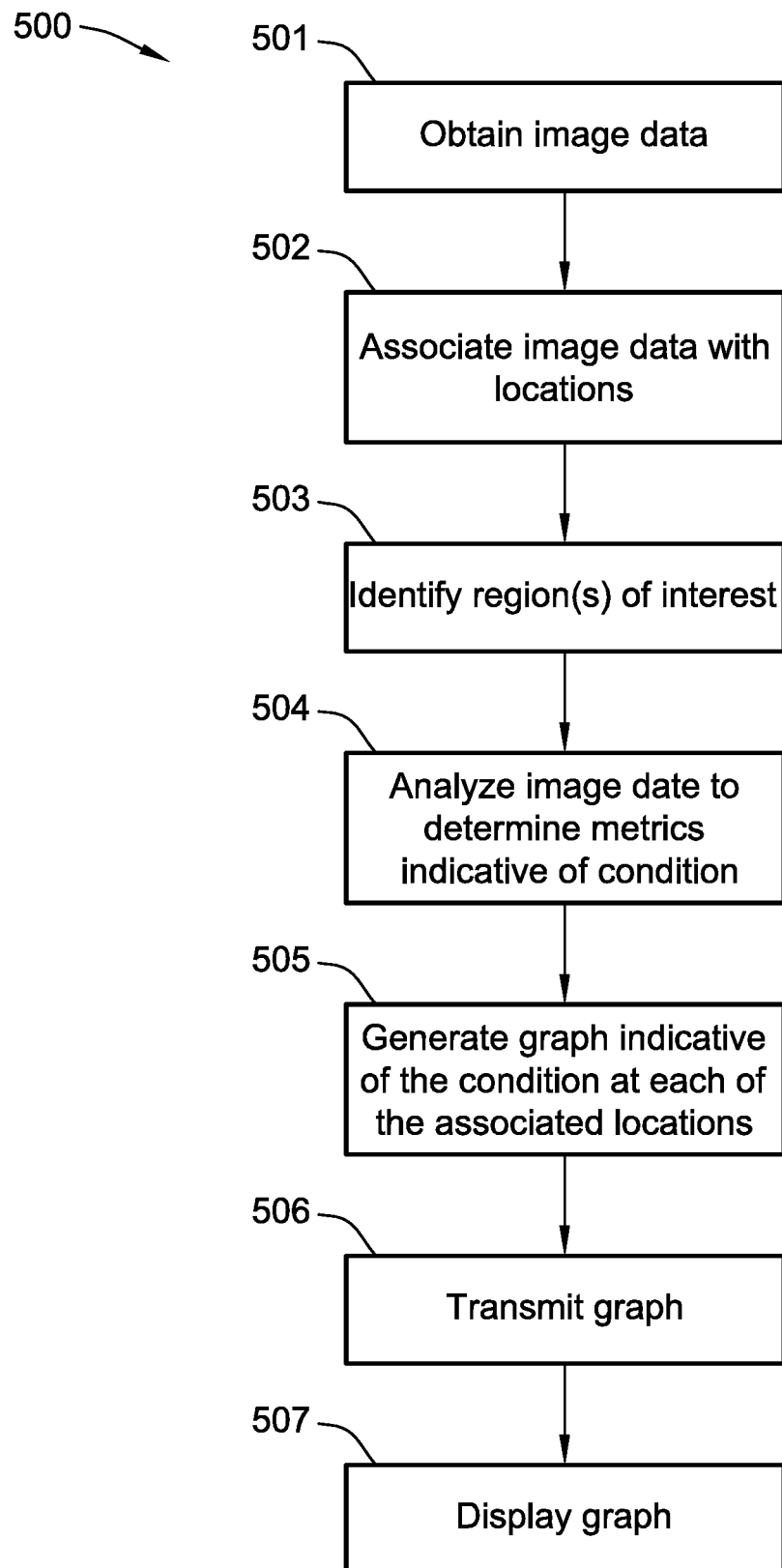
FIG. 5 is a process flow diagram for a method for analyzing one or more conditions of a railroad track, according to some implementations of the present disclosure.

Referring to FIG. 5, a method 500 for analyzing one or more conditions of a railroad is illustrated. The railroad (e.g., subway, elevated train, high speed rail, monorail, tram, etc.) can include one or more running rails, one or more conductor rails, a conductor rail cove, cross-ties (a/k/a ties or sleepers), tie plates, ballast, fasteners, joint bars, welds, switches, overhead power lines, signs (e.g., mileposts, whistle boards, etc.), signals, or any combination thereof. The method 500 can be implemented using the system 10 (FIG. 1) described herein and/or any of the alternative inspection systems referenced herein.

Figure 3:
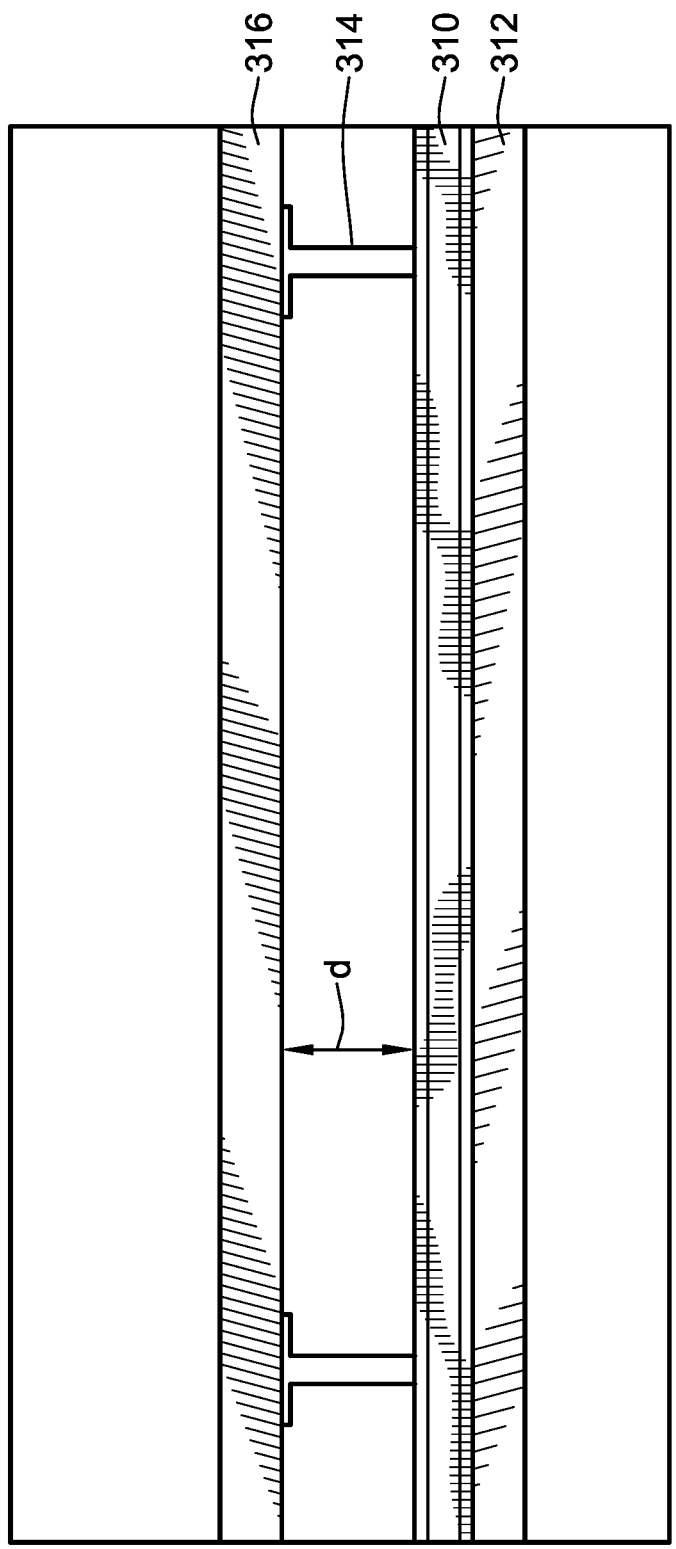
FIG. 3 is an image of a portion of the railroad including a conductive rail and a conductive rail cover, according to some implementations of the present disclosure.

Step 501 of the method 500 includes obtaining, using an imaging device (e.g., imaging device(s) 16 of the inspection system 10 described herein) image data reproducible as a plurality of images of a portion of the railroad. Each of the plurality of images are reproducible as an image of a portion of the railroad. The portion of the railroad in each of the images depends on the direction of the field of view of the imaging device(s) of the inspection system, as shown in FIGS. 2-4, for example.

During step 501, each of successive image is obtained at a predetermined interval from the prior image as the transport device 30 moves along the railroad. For example, the predetermined interval can be between about 6 inches and about 10 feet, between about 1 foot and about 5 feet, between about 2 feet and 3 feet, every foot, etc. That is, the associated location of each of the plurality of images obtained by the imaging device(s) 16 will be spaced from the associated locations of the prior and subsequently obtained images by the predetermined interval. The speed at which the imaging device(s) 16 obtain the plurality of images of the railroad can be adjusted based on the current speed of the transport device 30 (e.g., as determined by the sensor(s) 18) such that images are obtained at the predetermined interval despite changes in the speed of the transport device 30.

Step 502 of the method 500 includes associating each of the images obtained during 501 with a location. Locations on a railroad are often expressed in terms of a distance rather than absolute GPS coordinates. For example, locations can be defined by a distance from the beginning of the railroad (e.g., mile 1, mile 5.5, foot 1, foot 330, etc.) In some implementations, the GPS module 20 determines the GPS coordinates (e.g., latitude and longitude) of the transport device 30 when each image is obtained during step 501. These GPS coordinates can then be compared to a look-up table (e.g., stored in the memory device 14) to determine the location of the transport device 30 in terms of a distance as described above. Alternatively, once the location of a first image is determined, the locations of subsequent images can be determined based on the predetermined interval described above. Once determined, each image is associated with the location of the transport device 30 when the image was obtained. Thus, a first image will be associated with a first location and a second image will be associated with a second location that is spaced from the first location by the predetermined interval.

Step 502 of the method 500 can occur simultaneously or nearly simultaneously with step 501. That is, each image obtained during step 501 can be associated with the location of transport device in substantially real-time (e.g., within 0.1 seconds, 0.5 seconds, 1 second, five seconds, etc. after the image is obtained).

In some implementations, the method 500 optionally includes step 503, which includes identifying one or more regions of interest within each of the images obtained during step 501. For example, referring to FIG. 4, a first region of interest 450 is identified in the image of the railroad. While shown as generally rectangular in FIG. 4, the region(s) of interest can have any suitable size and can be defined by a square boundary, a circular boundary, a triangular boundary, a polygonal boundary, or any combination thereof. In some implementations, the region(s) of interest can be identified by a human user on a first image, and that region of interest is then applied to each subsequent image obtained during step 501. In other implementations, the region(s) of interest can be automatically identified within each of the images. For example, if the desired region of interest is a running rail, the system 10 can be configured to automatically identify the running rail within each of the images as the region of interest.

In some implementations, as shown in FIG. 4, the region of interest can be positioned at a predetermined distance (e.g., 2 feet, 5 feet, 10 feet, 50 feet, 100 feet, etc.) ahead of the current location of the transport device. In such implementations, step 502 is modified to account for this different in position. As described above, step 502 includes associating each of the images with a location based on the current location of the transport device. In the case where the region of interest is a predetermined distance ahead or behind the current location of the transport device, step 502 adds or subtracts the predetermined distance such that the image is associated with the actual location of the image (and not the location of the transport device). For example, if it is determined that the transport device is at "100 feet" and the predetermined distance for the region of interest is 10 feet, then the image will be associated with "110 feet."

Step 504 of the method 500 includes analyzing the image data to determine metrics associated with one or more conditions of the railroad. That is, the system analyzes each of the plurality of images obtained during step 501 and determines a metric indicative of a condition. Each metric is associated with the location that is associated with that image during step 502. In such implementations in which the method 500 includes step 503, step 504 includes analyzing the region(s) of interest within each image rather than the entire image. Exemplary metrics and conditions of the railroad are described in further detail below.

As described in further detail below in reference to each of the exemplary conditions, step 504 can include identifying certain features or components of the railroad that are used to determine the metric at each associated location. To do so, trained algorithms can be applied to each of the images to identify the features or components. These trained algorithms can be machine learning algorithms, neutral networks, regression models, etc. that are trained using reference image data. For example, an algorithm can be trained to identify vegetation growing on or adjacent to the railroad in each of the images using reference images of railroads with and without vegetation.

Additionally, as described in further detail below, step 504 can include determining distances within each of the plurality of images. In some implementations, in order to improve the accuracy of these distance determinations, the method 500 can include a calibration step (not shown) prior to steps 501-507. In such implementations, the calibration step includes positioning a reference object within the field of view of the imaging device and obtaining an image containing the reference object. The reference object has one or more known dimensions (e.g., length, width, height). For example, the reference object can be precisely machined to further refine the known dimensions. The calibration step includes analyzing the image to determine a number of pixels corresponding to each known dimension of the reference object. Based on the known dimension(s) of the reference object and the number of pixels, each pixel within the image can be assigned a distance. For example, if a known distance of 10 inches corresponds to 1,000 pixels, each pixel can be assigned a distance of 0.01 inches. The distance of each of pixel can then be used to determined unknown distances within the image by counting the number of pixels along the unknown distance and multiplying the by distance assigned to each pixel during the calibration step. Thus, unknown distances can be determined in subsequently obtained images from the same imaging device using the information obtained during the calibration step.

Figure 6:
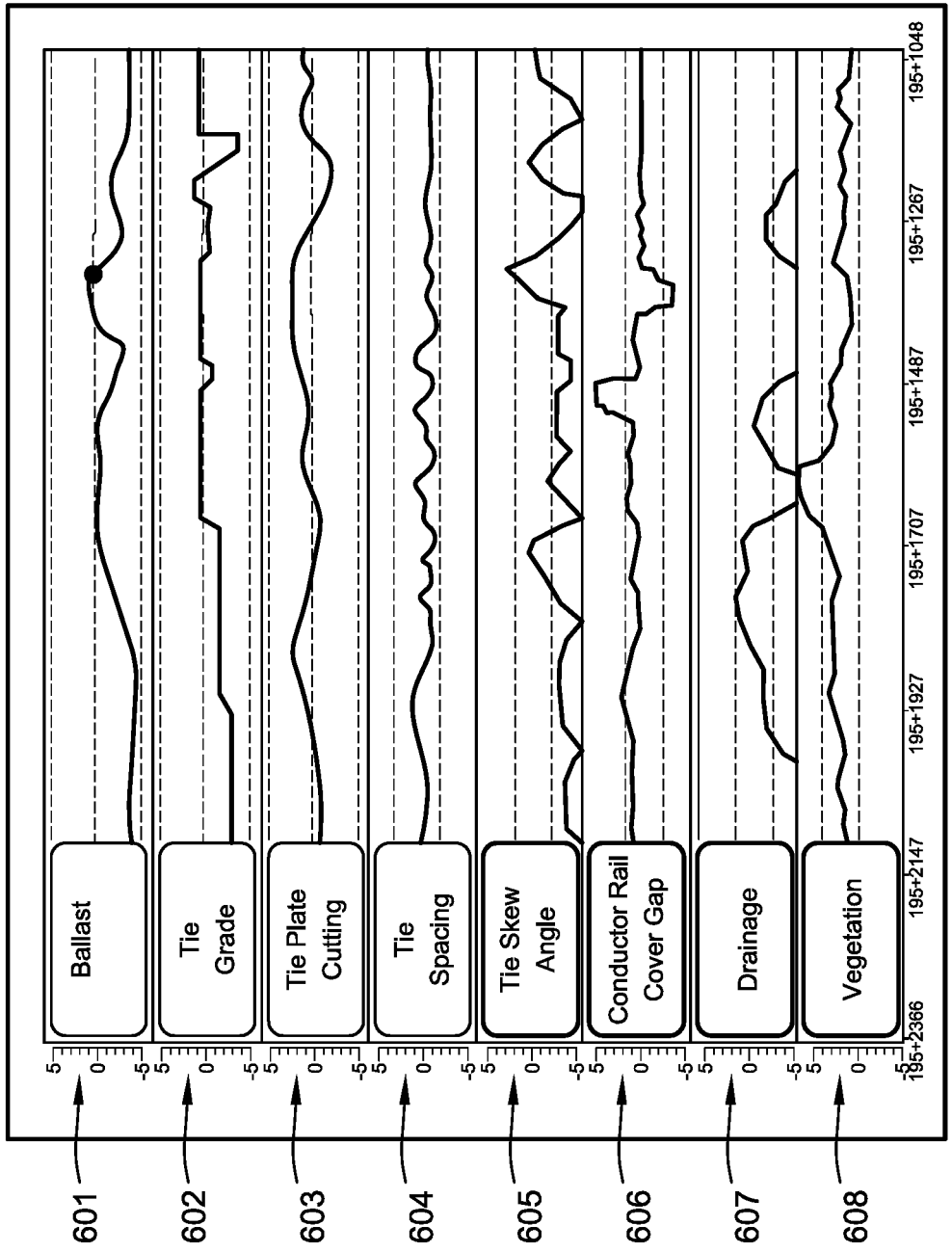
FIG. 6 illustrates a plurality of graphs indicative of conditions of a railroad, according to some implementations of the present disclosure.

Step 505 of the method 500 includes generating a graph indicative of the condition at each of the associated locations. Exemplary graphs are illustrated in FIG. 6 and are described in further detail herein. Generally, each graph can be in the form of a one-dimensional strip chart and plots the determined metrics against the associated locations. That is, a first axis (e.g., x-axis) of the graph is indicative of each of the associated locations along the railroad and a second axis (e.g., y-axis) of the graph is indicative of a value of the determined metrics.

Step 506 of the method 500 includes transmitting the graph(s) generated during step 506 from the transport device to a remote device or system. For example, as shown in FIG. 1, the inspection system 10 is located on the transport device 30. Thus, steps 501-504 can be performed by the processor 12 and memory device 14 of the system 10 that are located on the transport device 30. Step 506 includes transmitting the generated graph(s) via the communication module 22 to the communication module 42 of the remote device 40.

By transmitting data or information describing the graph(s) generated during step 505 (i.e., just that the graph can be reproduced and displayed on the display device 44) instead of all of the image data obtained during step 501, the transferred file size can be greatly reduced (e.g., several MB versus several GB). This allows for substantially real-time transfer of data from the inspection system located on the transport device to a remote device where it can be viewed and analyzed in substantially real-time by a user.

Step 507 of the method 500 includes displaying the graph(s) on a display device (e.g., the display device 44 of the remote device 40) for viewing by a human user. A user can adjust the scale of the displayed first axis of the graph(s) to show, for example, all of the associated location (i.e., the entire length of the railroad that was inspected) or a particular range of locations (e.g., a particular 10-foot length, a particular 100-foot length, etc.) Likewise, a user can adjust the scale of the displayed second axis of the graph(s) to show differences in the values of the metrics at different locations with increasing or decreasing granularity. A user can also select individual points on the graph(s) (e.g., by clicking or hovering over a particular location) to display the value of the metric and associated location for that point on the graph.

In some implementations, the display device can further display one or more movable visual markers. For example, if a plurality of graphs is displayed simultaneously (e.g., as shown in FIG. 6), a vertical marker can be overlaid on some or all of the plurality of graphs to allow a user to more easily compare the metric indicative of a first condition at a first location on a first graph with the metric indicative of a second condition the first location on a second graph.

Ballast Condition

In some implementations, the condition of the railroad is a ballast condition. Ballast typically comprises crushed stone and is generally used to keep the railroad track in place, aid in reducing or absorbing vibrations caused by railroad vehicles, aid in draining water away from the track, and aid in inhibiting or reducing vegetation growth. Referring to FIG. 2, for example, the ballast 214 typically has irregular shapes and sharp edges to aid in securing the cross-ties 212A and 212B.

Over time, railroad ballast may become "fouled" or degraded. This can occur due to the ballast being crushed from repeated loading, wear and tear, and other disturbances. Mud or other debris can also clog the ballast, reducing its ability to drain water away from the track. Fouled ballast also has a reduced ability to secure the cross-ties and prevent lateral movement due to its change in shape. As an example of the kind of differences between fresh ballast and fouled ballast, referring to FIG. 2, an area 216A of fresh ballast is shown and an area 216B of fouled ballast is shown. The fresh ballast area 216A has stones with irregular shapes that are closely packed together, whereas the fouled ballast area 216B has stones with more rounded shapes and mud between some of the stones.

In some implementations, step 504 includes analyzing the plurality of images obtained during step 501 to determine a plurality of metrics indicative of a ballast condition at each of the associated locations. In such implementations, the metrics determined in step 504 are based on a determined texture of the ballast in each image, a determined color of the ballast in each image, or both. As described above, rounder ballast stones are indicative of fouled ballast, whereas irregularly shaped stones with sharp edges are indicative of fresh ballast. Similarly, darker colors are indicative of mud or debris (i.e., fouled ballast) whereas lighter colors (e.g., gray) are indicative of fresh ballast. As described above, an algorithm can be trained using reference data to identify the texture and/or color of the ballast to determine the metric at each of the associated locations.

In some implementations, the metric indicative of the condition of the ballast at each location can be expressed as a number whose value is indicative of the condition of the ballast. For example, the number 0 can be used to indicate that there is no fouled ballast at a location and the number 1 can be used to indicate that there is heavily fouled ballast at a location, with numbers there between being indicative of levels of fouled ballast between none and heavily fouled.

During step 505 of the method, a graph indicative of the ballast condition is generated using the determined metrics from step 504. The graph is then displayed during step 507 of the method. Referring to FIG. 6, graph 601 is an exemplary graph indicative of the condition of the ballast. As shown, each point along the x-axis is indicative of the associated location on the railroad and the value of the y-axis corresponds to the determined metric at that location. A user viewing graph 601 can easily and efficiently identify locations or stretches of the railroad where there is fouled ballast that requires maintenance (e.g., cleaning or replacement of the ballast).

In other implementations, the determined metric indicative of the condition of the ballast can be binary. That is, the determined metric for each location can be either a 1 or 0 based on the texture and/or color of the ballast. For example, if the texture and/or color of the ballast satisfy a certain threshold indicative of fouled ballast that is need of maintenance/replacement, the metric for that location is a 1 (fouled ballast), whereas if the texture and/or color do not satisfy that threshold are assigned a 0. In such implementations, the graph 601 will clearly show points where there is fouled ballast (i.e., where the determined metric is a 1) and points where there is no fouled ballast (i.e., where the determined metric is a 0) to aid a user in quickly and efficiently identifying locations where maintenance/repair is suggested or required.

The method 500 described herein can be repeated one or more times for the same locations along the railroad. For example, the method 500 can be performed a first time for a segment of the railroad and then again at a second, later time for the same segment of the railroad. Both times, a graph indicative of a condition of the railroad is generated. After the method has been completed the second time, these two graphs can be displayed simultaneously, allowing a user to compare the graphs and identify any changes since the first time the railroad was inspected. In this manner, a plurality of graphs indicative of the same condition at the same locations can be displayed simultaneously (e.g., a first graph can be displayed with a second graph that was generated 6 months after the first graph and a third graph that was generated 3 months after the second graph was generated).

For example, if a user viewing the first graph determines that a particular location may need repair based on the determined metric at that location, and that location is not repaired prior to the generation of the second graph, the user can examine the second graph to see whether the condition at that location has worsened or improved. Similarly, in another example, if the user determined based on the first graph that a particular location is in need of repair and sent a maintenance crew only to find that there was actually no need for a repair, viewing the first and second graphs simultaneously can aid the user in identifying this false positive on the second graph and avoid repeating the same process. In this manner, the user can more efficiently allocate resources for the repair/maintenance of the railroad.

In some implementations, a symbol (e.g., a shape, a letter, a number, etc.) can be overlaid on the displayed graph at locations where it is determined that the associated metric exceeds or falls below a predetermined threshold. This can aid a user identifying location(s) along the railroad track where attention is required.

Cross-Tie Conditions

In some implementations, the condition of the railroad is a condition of the cross-ties of the railroad. As set forth below, different types of metrics that are indicative of the condition of the cross-ties can be determined.

First, the determined metrics can be a cross-tie grade. Cross-tie grades are used by railroads to indicate damage to individual cross-ties. For example, railroads often use cross-tie grades between 1-5, where a grade of 1 is indicative of a substantially undamaged or quality cross-tie, a grade of 5 is indicative of a heavily damage cross-tie, and grades 2-4 are indicative of cross-ties having conditions between substantially undamaged and heavily damaged. Many railroads manually inspect each individual cross-tie to assign these grades. In such implementations, the metrics determined during step 504 are based on a determined crack density of the cross-tie at each associated location. Cracking on the cross-tie is indicative of the cross-tie grade: little or no cracking is indicative of a grade of 1, whereas significant cracking is indicative of a graph of 5. For example, referring to FIG. 2, cross-tie 212C includes cracks 220. These cracks 220 can be identified in each of the images obtained during step 501 using the trained algorithms described herein.

The crack density can be determined based on the crack density of one or more regions of a cross-tie, such as, for example, a region that is generally in the center of the cross-tie (between the running rails) or a region that is directly adjacent to the tie plate (described further below). These regions can be identified as a region of interest during step 503 described above. The crack density within a region is defined as the area of all cracks identified in the region divided by the area of the region. Thus, during step 504, all cracks are identified within each region, the area of each crack is determined and then added together. By then taking the ratio of the total crack area to the total area of the region of the cracks, the crack density of the region is determined. The crack density metric can be a percentage between 0 and 100, or a dimensionless value between 0 and 1.

Referring to FIG. 6, graph 602 is an exemplary graph that is indicative of the cross-tie grade metric. As shown, the graph 602 illustrates cross-tie grade fluctuations and trends along the length of the railroad (e.g., between grades of 1-5). Thus, a user viewing the graph 602 can quickly and easily find locations where the cross-tie grade is indicative of a damaged cross-tie, and prioritize repair or replacement. In some implementations, only grades above a predetermined threshold are displayed on the graph 602. For example, a user can choose to display only grades that are 4 and above. This can aid a user identifying the locations of cross-ties that are in need of repair or replacement.

Second, the determined metrics can be a cross-tie plate-cutting metric. Referring to FIG. 2, each cross-tie 212 includes a pair of tie plates 230 that are coupled to (e.g., via fasteners) to the upper surface of the cross-tie. Each tie plate 230 has a rail seat that aids in securing the running rail to the cross-tie 212. Typically, the cross-ties 212 comprise wood and the tie plates comprise metal (e.g., steel). As trains move along the track, the train can cause lateral movement of the running rails 210A and 210B, which is resisted by the cross-tie 212 and cross-tie plate 230. Often, during such lateral movement, the cross-tie 212 (which is made of metal) digs into the cross-tie 212, leaving an indentation, such as indentation 232 shown in FIG. 2. This often referred to as "plate-cutting." This plate-cutting not only damages the cross-tie 212, but also serves an indicator of lateral movement of the rails that may require remedial action.

The plating-cutting metrics can be determined based on a distance between an end of the tie plate and the indentation in the cross-tie caused by movement of the tie-plate. Larger distances are indicative of larger indentations, which in turn are indicative of damage to the cross-tie and lateral movement of the rails. A distance of zero indicates that there is no plate-cutting. Thus, step 504 includes, for example, determining a distance between the end of the tie plate 230 and the indentation 232. As described above, a calibration step can be initially performed to aid in accurately determining this distance.

Referring to FIG. 6, graph 603 is an exemplary graph that is indicative of a cross-tie plate-cutting metric. As shown, the graph 603 illustrates plate-cutting fluctuations and trends along the length of the railroad. Thus, a user viewing the graph 603 can quickly and easily find locations where there is significant plate-cutting requiring repair or replacement.

Third, determined metrics can be a cross-tie spacing metric. Cross-ties are typically spaced from adjacent cross-ties by a predetermined distance. For example, cross-ties are often spaced apart from one another by 18 inches. In such implementations, the determined metrics are based on a determined distance between adjacent cross-ties. For example, referring to FIG. 2, the distance between the first cross-tie 212A and the second cross-tie 212B can be determined by analyzing the image of the railroad.

Referring to FIG. 6, graph 604 is an exemplary graph that is indicative of the cross-tie spacing metrics at each of the associated locations. As shown, the graph 604 illustrates fluctuations and trends in the spacing between cross-ties along the length of the railroad. Thus, a user viewing graph 604 can easily and efficiently identify locations where the cross-tie spacing does not conform to the railroad's predetermined spacing. To that end, in some implementation, only determined metrics that are predetermined threshold above or below the railroad's cross-tie spacing specification are displayed on the graph 604. For example, if the railroad specifies that the spacing between cross-ties should be 18 inches, only determined metrics that are 3 inches greater than or less than 18 inches are displayed (i.e., cross-ties that are too far apart or too close together). This aids a user in determining location(s) of cross-ties whose spacing may need to be readjusted to comply with the railroad standards compared to location(s) where the spacing is so close to the railroad's specification that no action may be required (or at least a lower priority can be assigned to those locations).

Fourth, the determined metrics can be a cross-tie skew angle metric. As shown in FIG. 2 for example, the railroad running rails span parallel to one another and the cross-ties extend perpendicular to the running rails. It is desirable for each cross-tie to be as close to perpendicular to the running rails as possible. A large cross-tie skew angle could also be indicative of the fact that the cross-tie is not adequately secured to one or more of the running rails.

The cross-tie skew angle metric can be determined during step 504 by identifying one or more of the running rails in each of the images (e.g., using the trained algorithms described herein). Once a path of one or both of the running rails is identified, a reference line perpendicular to that path can be generated. Next, the distance of each of the cross-tie in the image to the reference line can be determined. Then, the angle of the cross-tie relative to the reference line can be determined.

Referring to FIG. 6, graph 605 is an exemplary graph that is indicative of the cross-tie skew angle metrics at each of the associated locations. As shown, the graph 605 illustrates fluctuations and trends in the cross-tie skew angle along the length of the railroad. Thus, a user viewing graph 605 can easily and efficiently identify locations where the cross-tie skew angle is out of tolerance (e.g., more than +/−5 degrees, more than +/−10 degrees, more than +/−25 degrees, etc.) To that end, in some implementation, only determined metrics that are predetermined threshold above or below a skew angle of 0 are displayed on the graph 605. This aids a user in determining location(s) of cross-ties that may need realignment to the rails.

Conductor Rail Cover Condition

In some implementations, the condition of the railroad is a condition of the conductor rail cover. As described above and referring to FIG. 3, a railroad (e.g., subway or elevated train) can include the conductor rail cover 316 to help protect the electrified conductor rail 310. The train receives power from the conductor rail 310 using a shoe that contacts and travels along the upper surface of the conductor rail 310. Thus, the distance d between the cover 316 and the rail 310 needs to be sufficient to allow the shoe to fit between them.

In some implementations, step 504 includes analyzing the plurality of images obtained during step 501 to determine a plurality of metrics indicative of a condition conductor rail cover. The determined metric at each location can be determined, for example, by determining the distance d between the conductor rail 310 and the cover 316 at each of the associated locations.

The determined metric can also be based on the railroad's specified clearance distance for the conductor rail and the cover. Thus, the metric can be determined as a ratio of the determined distance and the railroad's specified clearance, and expressed as a percentage. Alternatively, the metric can be binary, that is, a value of 1 indicates that the determined distance is less than the specified clearance and a value of 0 indicates that the determined distance is greater than the specified clearance.

During step 505 of the method, a graph indicative of the condition of the cover is generated using the determined metrics from step 504. The graph is then displayed during step 507 of the method. Referring to FIG. 6, graph 606 is an exemplary graph indicative of the condition of the cover. As shown, each point along the x-axis is indicative of the associated location on the railroad and the value of the y-axis corresponds to the determined metric at that location. A user viewing graph 606 can easily and efficiently identify locations or stretches of the railroad where the distance between the cover and the conductor rail is too close and may need to be adjusted. In some implementations, the determined metric is only displayed if it is lower than a predefined threshold to aid a user in identifying locations where repair may be needed.

Drainage Condition

In some implementations, the condition of the railroad is a drainage condition. The presence of standing water on or adjacent to the railroad track can be problematic for a number of reasons. For example, standing water can damage the rails, cause the track bed to sink, or pose an electrocution risk in the case of an electrified conductor rail. Standing water can also freeze in cold conditions, damaging the track and/or causing a switch to seize up. As described herein, ballast is often used to aid in draining water away from the track. However, some railroads (e.g., subways) do not use ballast, and instead use what is often referred to as a "slab track" where the running rails are directly attached to a concrete slab. Slab tracks often use drains, which may become clogged over time. Thus, is it advantageous to identify areas of standing water to identify areas of the railroad where drainage problems can be remediated.

In some implementations, step 504 includes analyzing the plurality of images obtained during step 501 to determine a plurality of metrics indicative of a drainage condition. The determined metric at each location can be determined, for example, identifying areas of standing water in which image or region(s) of interest. Areas of standing water can be identified using, for example, a trained algorithm or a thermal imaging device. The thermal imaging device can identify areas of standing water by identifying areas where the temperature is lower than the surrounding areas and/or the ambient temperature, which is indicative of standing water. The determined metric at each location can be based on the mere presence or absence of standing water. That is, the metric is binary where a value of 1 means that standing water is identified and a value of 0 means that no standing water was identified. Alternatively, the determined metric can be a ratio of the area of standing water versus the total area of the image or region of interest. This can aid a user in later identifying areas where there is more standing water than other areas and prioritize repairs.

During step 505 of the method, a graph indicative of the drainage condition of the railroad is generated using the determined metrics from step 504. The graph is then displayed during step 507 of the method. Referring to FIG. 6, graph 607 is an exemplary graph indicative of the drainage condition. As shown, each point along the x-axis is indicative of the associated location on the railroad and the value of the y-axis corresponds to the determined metric at that location. A user viewing graph 607 can easily and efficiently identify locations or stretches of the railroad where there is standing water.

Vegetation Condition

In some implementations, the condition of the railroad is a vegetation condition. The peripheries of a railroad are typically surrounded by vegetation (e.g., grass, weeds, brushes, trees, etc.). Referring to FIG. 4, for example, vegetation 402 is present on both sides of the railroad track and some vegetation 402 is positioned directly adjacent to or between the running rails 210A and 210B. While the ballast generally aids in preventing vegetation growth, as shown, sometimes vegetation (e.g., weeds) can grow in the ballast.

The growth of this vegetation within the railroad right-of-way or clearance envelope of the train can be problematic. For one example, a tree branch growing onto the right-of-way could pose a safety hazard requiring trimming. Many railroads specify a required distance between the track and the surrounding vegetation and regularly trim the vegetation to comply with this distance.

In some implementations, step 504 includes analyzing the plurality of images obtained during step 501 to determine a plurality of metrics indicative of a vegetation condition at each of the associated locations. The vegetation metric at each location can be determined, for example, by identifying vegetation in each of the plurality of images (e.g., using trained algorithms) or regions(s) of interest within the images. A ratio of the total area of vegetation compared to the total area of the image or region(s) of interest can be calculated to determine the vegetation metric, which can be a percentage or dimensionless (between 0 and 1).

Alternatively, step 504 can including analyzing the plurality of images to determine a distance between the ends of the cross-ties or the running rails and vegetation growing on the sides of the railroad. The vegetation metric can also be based on the railroad's specified clearance distance for the vegetation. Thus, the vegetation metric can be determined as a ratio of the determined distance and the railroad's specified clearance, and expressed as a percentage. This percentage is indicative of the relative compliance or non-compliance of the vegetation at a particular location is. For example, if the determined distance is 200% of the specified distance at location 1 and the determined distance is 105% of the specified distance at location, both are in compliance but location 2 is closer to being out of compliance that location 1. Alternatively, the vegetation metric can be binary, that is, a value of 1 indicates that the determined distance is greater than the specified clearance and a value of 0 indicates that the determined distance is less than the specified clearance.

During step 505 of the method, a graph indicative of the vegetation condition is generated using the determined metrics from step 504. The graph is then displayed during step 507 of the method. Referring to FIG. 6, graph 608 is an exemplary graph indicative of the condition of the ballast. As shown, each point along the x-axis is indicative of the associated location on the railroad and the value of the y-axis corresponds to the determined metric at that location. A user viewing graph 608 can easily and efficiently identify locations or stretches of the railroad where there is vegetation that may need to be removed. In some implementations, the determined vegetation metric is only displayed if it exceeds a predefined threshold to aid a user in identifying locations where removal may be needed.

The systems and methods disclosed herein offer several advantages compared to prior inspection systems and methods. It would be extremely time consuming and inefficient for a user to view and analyze each of the plurality of obtained images (e.g., for several miles of the railroad) to identify the various conditions described herein. Similarly, given that these obtained images often constitute a large data file (e.g., several gigabytes), it is impractical or difficult to transmit all of the images from the transport device to a remote system or device for analysis and/or viewing in real-time, especially in the case where the transport device is an autonomous vehicle. Indeed, transferring the obtained data is a critical component in implementing a fully autonomous inspection system. These prior systems also suffer from another drawback in that they typically only identify the presence or absence of certain isolated defects or features (e.g., cracks, missing track components, etc.) and do not quantitatively assess the types of conditions described herein and/or trends in the conditions either at different locations or different times for the same location.

The systems and methods disclosed herein address these and other problems by analyzing the images in substantially real-time on the transport device to determine metrics that are indicative of various conditions, generating a graph that is indicative of those various conditions, and then transmitting the graph off of the transport device for viewing or further analysis by a human user. In other words, the graph(s) offer an intuitive statistical summary without the need for reprocessing all of the obtained image data.

As described herein, a user can adjust the scale of the displayed graph to see determined metrics for a desired length of the railroad track (e.g., a mile or ten feet), bringing the condition into focus as needed. This functionality allows a user to see, for example, the condition of individual cross-ties or a broader trend of the condition of hundreds or thousands of cross-ties. Further, a user can focus on the condition of the railroad at specific locations with precision.

While the system 10 and the method 500 have been generally described herein in reference to a railroad, it should be understood that any of the methods and systems described here can be implemented to analyze a roadway (e.g., highways, airport runways, etc.) In such implementations, a method that is the same as, or similar to, the method 500 (FIG. 5) can be used to generate and display graphs indicative of various conditions of the roadway that are the same as, or similar to, the graphs and conditions of the railroad described herein. For example, the conditions can be a road surface condition where the determined metrics are crack density or missing portions of pavement. As another example, the condition can be a thermal condition of the roadway where the determined metrics include a maximum temperature, a minimum temperature, an average temperature, a temperature standard deviation, or any combination thereof. As yet another example, the condition can be a drainage condition where the determined metrics include the presence of standing water on the roadway.

Corrugation Condition

In some implementations, the condition of the railroad is a rail corrugation condition. Rail corrugation can develop over time from contact (e.g., friction) between the rail(s) and the wheel set of the transport device 30. Wear caused by this contact forms troughs and crests in the rail, which may develop into rail corrugation. Rail corrugation can be represented in wavelength. Typically, heavily corrugated rails experience a concave deformation on surface of the rail at an interval (e.g., a 20 mm interval, a 200 mm interval, etc.). Rail corrugation can decrease the service life of rails, and in some cases require rail replacement. Rail corrugation can also cause undesirable noise as the transport device 30 moves along sections of the rail(s) with corrugation.

In some implementations, step 504 includes analyzing the plurality of images obtained during step 501 to determine a plurality of metrics indicative of a corrugation condition at each of the associated locations along the railroad. The metric at each location can be determined, for example, by identifying corrugation in each of the plurality of images (e.g., using trained algorithms) or regions(s) of interest within the images. In some implementations, the metric indicative of the rail corrugation condition at each location can be expressed as a number or value that is indicative of the rail corrugation condition. For example, the number 0 can be used to indicate that there is no rail corrugation at a first location and the number 1 can be used to indicate that there is rail corrugation at a second location.

Figure 7:
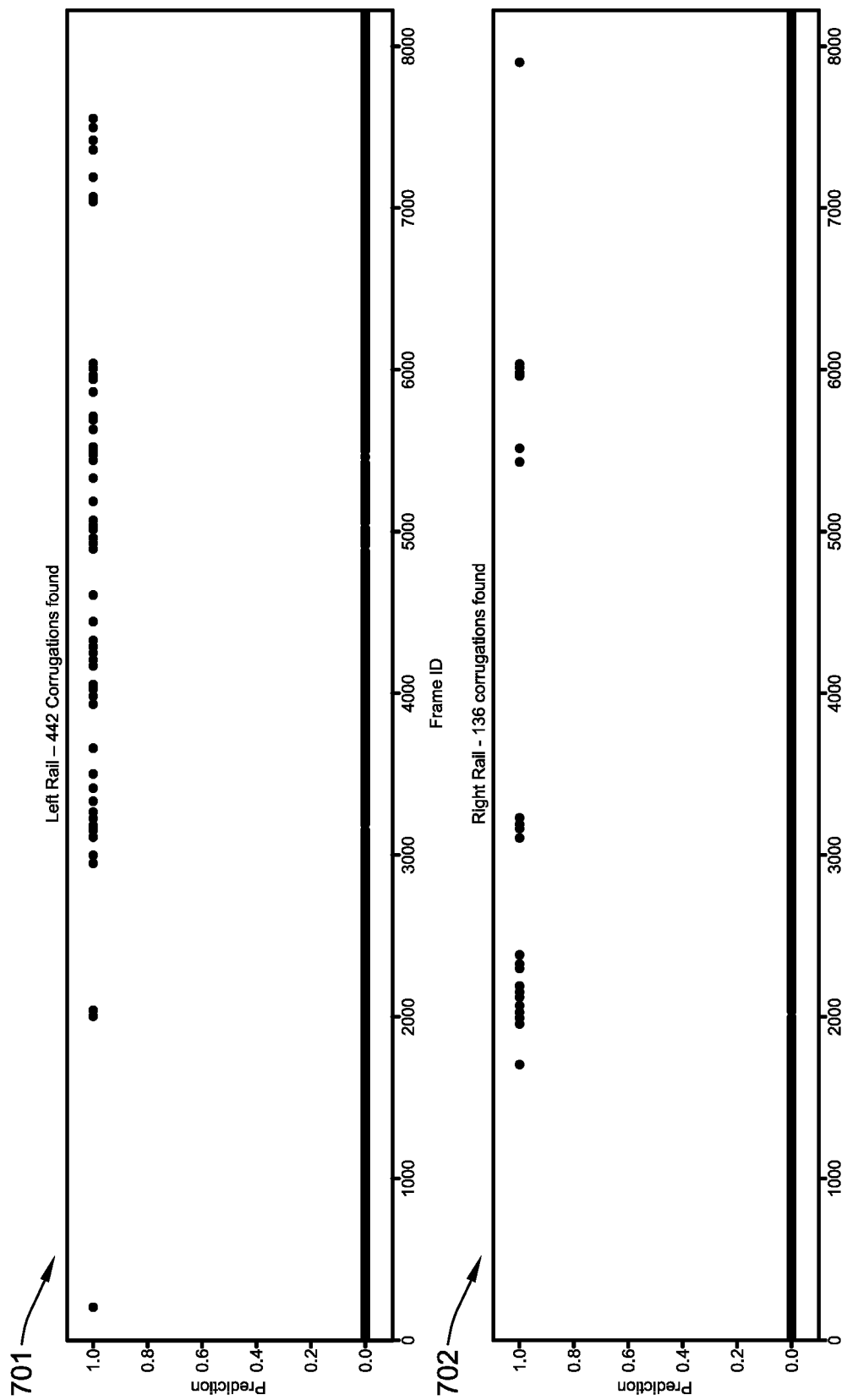
FIG. 7 illustrates a plurality of graphs indicative of a rail corrugation condition of a railroad, according to some implementations of the present disclosure.

In such implementations, during step 505 of the method, a graph indicative of the rail corrugation condition is generated using the determined metrics from step 504. The graph is then displayed during step 507 of the method. Referring to FIG. 7, a first graph 701 is an exemplary graph indicative of the rail corrugation condition for a first rail (e.g., the first running rail 210A shown in FIG. 2) and a second graph 702 is an exemplary graph indicate of the rail corrugation condition for a second rail (e.g., the second running rail 210B shown in FIG. 2). As shown, each point along the x-axis is indicative of the associated location on the railroad and the value of the y-axis corresponds to the determined metric at that location. A user viewing graph 701 and/or graph 702 can easily and efficiently identify locations or stretches of the railroad where there is rail corrugation that may require rail maintenance (e.g., rail grinding) or replacement.

While the various distances described herein are expressed in terms of miles, more generally, any unit of distance (e.g., feet, meters, kilometers, etc.) or any combination of units of distance can be used in accordance with the systems and methods described herein.

Alternative Implementations

Alternative Implementation 1. A method for analyzing one or more conditions of a transportation pathway comprising: obtaining, using an imaging device of an inspection system, image data reproducible as a plurality of images of the transportation pathway, each of the plurality of images being reproducible as an image of a portion of the transportation pathway, each portion of the transportation pathway having an associated location along a length of the transportation pathway, analyzing, using one or more processors of the inspection system, the image data to determine a first plurality of metrics indicative of a condition of the transportation pathway at each of the associated locations, and generating a first graph, using the determined first plurality of metrics, that is indicative of the condition of the transportation pathway at each of the associated locations.

Alternative Implementation 2. The method according to alternative implementation 1, wherein the analyzing includes identifying one or more regions of interest within each of the plurality of images.

Alternative Implementation 3. The method according to alternative implementation 2, wherein the analyzing includes analyzing the identified one or more regions of interest to determine the first plurality of metrics indicative of the condition of the transportation pathway at each of the associated locations.

Alternative Implementation 4. The method according to alternative implementation 2 or 3, wherein the region of interest is defined by a square boundary, a circular boundary, a triangular boundary, a polygonal boundary, or any combination thereof.

Alternative Implementation 5. The method according to any one of alternative implementations 1-4, further comprising: analyzing, using at least one of the one or more processors, the image data to determine a second plurality of metrics indicative of a second condition of the transportation pathway at each of the associated locations; and generating a second graph, using the determined second plurality of metrics, that is indicative of the second condition of the transportation pathway at each of the associated locations.

Alternative Implementation 6. The method according to alternative implementation 5, further comprising displaying the first graph and the second graph on a display device at the same time.

Alternative Implementation 7. The method according to any one of alternative implementations 1-6, wherein the first graph includes a first axis indicative of a value of the determined first plurality of metrics and a second axis indicative of each of the associated locations along the transportation pathway.

Alternative Implementation 8. The method according to any one of alternative implementations 1-7, wherein the imaging device and the one or more processors are coupled to a transport device configured to move along the transportation pathway.

Alternative Implementation 9. The method according to alternative implementation 8, further comprising transmitting the generated first graph to a remote device that is not coupled to the transport device such that the first graph can be displayed on the remote device.

Alternative Implementation 10. The method according to alternative implementation 9, wherein the transmitting does not include transmitting the image data to the remote device.

Alternative Implementation 11. The method according to alternative implementation 9, further comprising, subsequent to the transmitting, deleting the image data.

Alternative Implementation 12. The method according any one of alternative implementations 1-11, wherein each of the associated locations along the length of the transportation pathway is a predetermined distance from a previous one of the associated locations along the transportation pathway.

Alternative Implementation 13. The method according to alternative implementation 12, wherein the predetermined distance is between about 6 inches and about 3 feet.

Alternative Implementation 14. The method according to any one of alternative implementations 1-13, wherein the transportation pathway is a railroad including one or more running rails, one or more conductor rails, one or more conductor rail covers, one or more cross-ties, ballast, joints, welds, fasteners, one or more switches, or any combination thereof.

Alternative Implementation 15. The method according to any one of alternative implementations 1-14, further comprising calibrating the inspection system such that the one or more processors are configured to determine one or more distances within each of the plurality of images.

Alternative Implementation 16. The method according to alternative implementation 15, wherein the calibrating includes obtaining, from the imaging device, a first image including an object having a known length; analyzing the first image to determine a number of pixels associated with the known length of the object; and based on the analyzing, assigning a distance to each pixel in the first image.

Alternative Implementation 17. The method according to alternative implementation 14, wherein the condition is a condition of the one or more running rails, a condition of the one or more conductor rails, a condition of the one or more cross-ties, a condition of the ballast, a condition of the joints, a condition of the welds, a condition of the fasteners, a condition of the one or more switches, or any combination thereof.

Alternative Implementation 18. The method according to alternative implementation 14, wherein the condition is a condition of the ballast and the first plurality of metrics is indicative of a texture of the ballast, a color of the ballast, or both, at each of the associated locations.

Alternative Implementation 19. The method according to alternative implementation 14, wherein the condition is a condition of the one or more cross-ties and the first plurality of metrics is indicative of a crack density of the one or more cross-ties at each of the associated locations.

Alternative Implementation 20. The method according to alternative implementation 14, wherein the condition is a condition of the one or more cross-ties and the first plurality of metrics is indicative of a distance between adjacent ones of the one or more cross-ties at each of the associated locations.

Alternative Implementation 21. The method according to alternative implementation 14, wherein the condition is a condition of the one or more cross-ties and the first plurality of metrics is indicative of a skew angle of the one or more cross-ties at each of the associated locations.

Alternative Implementation 22. The method according to alternative implementation 14, wherein the condition is a condition of the one or more cross-ties and the first plurality of metrics is indicative of a cross-tie plate-cutting at each of the associated locations.

Alternative Implementation 23. The method according to alternative implementation 14, wherein the one or more conductor rail covers are positioned adjacent to a surface of the one or more conductor rails.

Alternative Implementation 24. The method according to alternative implementation 23, wherein the condition is a condition of the one or more conductor rail covers and the first plurality of metrics is indicative of a distance between the one or more conductor rail covers and the surface of the one or more conductor rails at each of the associated locations.

Alternative Implementation 25. The method according to alternative implementation 14, wherein the condition is a drainage condition of the railroad and the first plurality of metrics is indicative of the presence or absence of standing water at each of the associated locations.

Alternative Implementation 26. The method according to alternative implementation 14, wherein the condition is a vegetation condition and the first plurality of metrics is indicative of a volume of vegetation within a right of way of the railroad at each of the associated locations.

Alternative Implementation 27. The method according to alternative implementation 14, wherein the imaging device is a thermal imaging device and the image data is thermal image data, and wherein the condition is a thermal condition of the railroad and the first plurality of metrics is indicative of a maximum temperature, a minimum temperature, an average temperature, a temperature standard deviation, or any combination thereof at each of the associated locations.

Alternative Implementation 28. The method according to any one of alternative implementations 1-27, wherein the transportation pathway is a roadway.

Alternative Implementation 29. The method according to alternative implementation 28, wherein the condition is a surface condition of the roadway, a drainage condition of the roadway, a thermal condition of the roadway, or any combination thereof.

Alternative Implementation 30. The method according to any one of alternative implementations 1-29, wherein the inspection system is coupled to a transport device that is configured to autonomously move along the transportation pathway.

Alternative Implementation 31. A method for analyzing ballast of a railroad, the method comprising: obtaining, using an imaging device of an inspection system, image data reproducible as a plurality of images of the railroad, each of the plurality of images being reproducible as an image of a portion of the railroad, each portion of the railroad having an associated location along a length of the railroad; determining a plurality of metrics by analyzing, using one or more processors of the inspection system, the image data, the plurality of metrics being indicative of a condition of the ballast of the railroad at each of the associated locations; and generating a graph using at least a portion of the determined plurality of metrics for visually illustrating the condition of the ballast of the railroad for at least a portion of the associated locations.

Alternative Implementation 32. The method according to alternative implementation 31, wherein the determined plurality of metrics is based at least in part on a texture of the ballast, a color of the ballast, or both.

Alternative Implementation 33. The method according to any one of alternative implementations 31 or 32, wherein the graph is a two-dimensional line graph and the method further comprises displaying the two-dimensional line graph on a display device.

Alternative Implementation 34. The method according to alternative implementation 33, further comprising, responsive to determining that a first one of the plurality of metrics at a first one of the associated locations is greater than a predefined threshold, overlaying a symbol on the two-dimensional line graph at a position corresponding to the first associated location.

Alternative Implementation 35. The method according to alternative implementation 33, wherein the two-dimensional line graph visually illustrates the condition of the ballast at a first time, the method further comprising displaying a second two-dimensional line graph on the display device at the same time that the two-dimensional line graph is displayed on the display device, the second two-dimensional line graph visually illustrating the condition of the ballast at a second time that is different than the first time.

Alternative Implementation 36. A method for analyzing cross-ties of a railroad, the method comprising: obtaining, using an imaging device of an inspection system, image data reproducible as a plurality of images of the railroad, each of the plurality of images being reproducible as an image of a portion the railroad, each portion of the railroad having an associated location along a length of the railroad; determining a plurality of metrics by analyzing, using one or more processors of the inspection system, the image data, the plurality of metrics being indicative of a condition of the cross-ties of the railroad at each of the associated locations; and generating a graph using at least a portion of the determined plurality of metrics for visually illustrating the condition of the cross-ties of the railroad for at least a portion of the associated locations.

Alternative Implementation 37. The method according to alternative implementation 36, wherein the determined plurality of metrics is indicative of a cross-tie grade of each of the cross-ties.

Alternative Implementation 38. The method according alternative implementation 37, wherein the analyzing includes determining a crack density in one or more portions of the cross-ties, and wherein the cross-tie grade is based on the determined crack density.

Alternative Implementation 39. The method according to alternative implementation 38, wherein the one or more portions of each of the cross-ties include a rail seat portion of the cross-ties, a center portion of the cross-ties, or both.

Alternative Implementation 40. The method according to any one of alternative implementations 36-39, wherein the determined plurality of metrics is indicative of a distance between adjacent ones of the cross-ties at each of the associated locations.

Alternative Implementation 41. The method according to any one of alternative implementations 36-40, wherein the determined plurality of metrics is indicative of a skew angle of the cross-ties at each of the associated locations.

Alternative Implementation 42. The method according to any one of alternative implementations 36-41, wherein the determined plurality of metrics is indicative of a cross-tie plate-cutting at each of the associated locations.

Alternative Implementation 43. A method for analyzing the presence or absence of one or more components of a railroad, the method comprising: obtaining, using an imaging device of an inspection system, image data reproducible as a plurality of images of the railroad, each of the plurality of images being reproducible as an image of a portion the railroad, each portion of the railroad having an associated location along a length of the railroad; determining a plurality of metrics by analyzing, using one or more processors of the inspection system, the image data, the plurality of metrics being indicative of the presence or absence of a component of the railroad at each of the associated locations; and generating a graph using at least a portion of the determined plurality of metrics for visually illustrating the presence or absence of the component of the railroad at each of the associated locations.

Alternative Implementation 44. The method according to alternative implementation 43, wherein the component of the railroad is a joint, a weld, a switch, or any combination thereof.

Alternative Implementation 45. The method according to alternative implementation 43 or 44, further comprising transmitting the generated graph to a remote device and displaying the graph on a display device of the remote device.

Alternative Implementation 46. The method according to alternative implementation 45, wherein the graph includes a symbol for each of the associated locations where the corresponding one of the plurality of metrics is indicative of the absence of the railroad component.

Alternative Implementation 47. The method according to alternative implementation 45, wherein the graph includes a symbol for each of the associated locations where the corresponding one of the plurality of metrics is indicative of the presence of the railroad component.

Alternative Implementation 48. The method according to any one of alternative implementations 44-47, wherein the analyzing includes comparing each of the plurality of images to one or more reference images to identify the presence or absence of the railroad feature using one or more trained algorithms.

Alternative Implementation 49. A method for analyzing a conductive rail cover for one or more conductor rails of a railroad, the method comprising: obtaining, using an imaging device of an inspection system, image data reproducible as a plurality of images of the railroad, each of the plurality of images being reproducible as an image of a portion the railroad, each portion of the railroad having an associated location along a length of the railroad; determining a plurality of metrics by analyzing, using one or more processors of the inspection system, the image data, the plurality of metrics being indicative of a distance between a surface of the one or more conductor rails and the conductor rail cover at each of the associated locations; and generating a graph using at least a portion of the determined plurality of metrics for visually illustrating the distance at each of the associated locations.

Alternative Implementation 50. The method according to alternative implementation 49, wherein the surface of the one or more conductor rails is an upper surface of the one or more conductor rails.

Alternative Implementation 51. The method according to alternative implementation 49, wherein the surface of the one or more conductor rails is a lower surface of the one or more conductor rails.

Alternative Implementation 52. The method according to any one of alternative implementations 49-51, further comprising, responsive to determining that a first one of the plurality of metrics at a first one of the associated locations is greater than a predefined threshold, overlaying a symbol on the graph at a position corresponding to the first associated location.

Alternative Implementation 53. A method for analyzing drainage of a railroad track, the method comprising: obtaining, using an imaging device of an inspection system, image data reproducible as a plurality of images of the railroad track, each of the plurality of images being reproducible as an image of a portion the railroad track, each portion of the railroad having an associated location along a length of the railroad track; determining a plurality of metrics by analyzing, using one or more processors of the inspection system, the image data, the plurality of metrics being indicative of a drainage condition of the railroad track; and generating a graph using at least a portion of the determined plurality of metrics for visually illustrating the drainage condition at each of the associated locations.

Alternative Implementation 54. The method according to alternative implementation 53, wherein the analyzing includes identifying the presence or absence of standing water in each of the plurality of images of the railroad track.

Alternative Implementation 55. The method according to alternative implementation 54, wherein the identifying includes determining an area of standing water in each of the plurality of images of the railroad track.

Alternative Implementation 56. The method according to alternative implementation 55, further comprising, responsive to identifying the presence of standing water at a first location of the associated locations, overlaying a symbol on the graph at a position corresponding to the first location.

Alternative Implementation 57. A method for analyzing vegetation within a right-of-way of a railroad, the method comprising: obtaining, using an imaging device of an inspection system, image data reproducible as a plurality of images of the railroad, each of the plurality of images being reproducible as an image of a portion the railroad, each portion of the railroad having an associated location along a length of the railroad; determining a plurality of metrics by analyzing, using one or more processors of the inspection system, the image data, the plurality of metrics being indicative of a condition of vegetation within the right-of-way of the railroad at each of the associated locations; and generating a graph using at least a portion of the determined plurality of metrics for visually illustrating the condition of the vegetation within the right-of-way of the railroad at each of the associated locations.

Alternative Implementation 58. The method according to alternative implementation 57, wherein the analyzing includes identifying an area of vegetation in each of the plurality of images and the plurality of metrics is a percentage area of vegetation within the right-of-way at each of the associated location.

Alternative Implementation 59. The method according to alternative implementation 58, wherein the identifying the area of vegetation in each of the plurality of images includes comparing each of the plurality of images to one or more reference images using one or more trained algorithms.

Alternative Implementation 60. The method according to alternative implementation 59, wherein the one or more trained algorithms includes a machine learning algorithm.

Alternative Implementation 61. A method for analyzing one or more conditions of a transportation pathway, the method comprising: obtaining, during a first inspection of the transportation pathway at a first time image data reproducible as a plurality of images of the transportation pathway, each of the plurality of images being reproducible as an image of a portion of the transportation pathway, each portion of the transportation pathway having an associated location along a length of the transportation pathway; determining a first plurality of metrics by analyzing the image data, the first plurality of metrics being indicative of a first condition of the transportation pathway at each of the associated locations at the first time; displaying a first graph, using at least a portion of the determined first plurality of metrics, to visually illustrate the first condition of the transportation pathway at each of the associated locations at the first time; and displaying a second graph, using at least a portion of a second plurality of metrics, to visually illustrate the first condition of the transportation pathway at each of the associated locations at a second time that is different from the first time.

Alternative Implementation 62. A method for analyzing one or more conditions of a railroad, the method comprising: obtaining, using an imaging device, image data reproducible as a plurality of images of the railroad, each of the plurality of images being reproducible as an image of a portion of the railroad, each portion of the railroad having an associated location along a length of the railroad; analyzing, using one or more processors, the image data to determine (i) a first plurality of metrics indicative of a first condition of the railroad at each of the associated locations and (ii) a second plurality of metrics indicative of a second condition of the railroad at each of the associated locations; displaying, on a display device, a first graph, using at least a portion of the first plurality of metrics, to visually illustrate the first condition of the railroad; and displaying, on the display device, a second graph, using at least a portion of the second plurality of metrics, to visually illustrate the second condition of the railroad, the second graph being displayed adjacent to the first graph on the display device at the same time.

Alternative Implementation 63. The method according to alternative implementation 62, wherein the imaging device and the one or more processors are coupled to a transport device configured to move along the railroad and the display device is not coupled to the transport device.

Alternative Implementation 64. The method according to alternative implementation 62, further comprising transmitting, using a communication module coupled to the transport device, information associated with the first graph and the second graph to a remote system.

Alternative Implementation 65. The method according to alternative implementation 64, wherein the transmitted information does not include the image data.

Alternative Implementation 66. A system for inspecting a transportation pathway, the system comprising: an imaging device; and a memory device storing machine readable instructions configured to be executed by one or more processors to cause the system to: cause the imaging device to generate first image data reproducible as a first image of a first portion of the transportation pathway at a first location; analyze the first image data; determine, based on the analysis of the first image data, a first metric indicative of a condition for the first portion of the transportation pathway; cause the imaging device to generate second image data reproducible as a second image of a second portion of the transportation pathway at a second location that is a predetermined distance from the first location; analyze the second image data; determine, based on the analysis of the second image data, a second metric indicative of the condition for the second portion of the transportation pathway; and generate a graph, using the determined first metric and the determined second metric, the generated graph for visually illustrating the condition at the first location and the second location.

Alternative Implementation 67. The system according to alternative implementation 66, wherein the transportation pathway is a railroad including a railroad track having one or more rails, one or more cross-ties, ballast, joints, welds, fasteners, a switch, or any combination thereof.

Alternative Implementation 68. The system according to alternative implementation 67, wherein the condition is a condition of the ballast of the railroad track.

Alternative Implementation 69. The system according to alternative implementation 68, wherein the first metric and second metric are indicative of a texture of the ballast, a color of the ballast, or both.

Alternative Implementation 70. The system according to alternative implementation 67, wherein the condition is a condition of the one or more cross-ties of the railroad track.

Alternative Implementation 71. The system according to alternative implementation 70, wherein the first metric and the second metric are indicative of a cross-tie grade.

Alternative Implementation 72. The system according to alternative implementation 71, wherein the first metric and the second metric indicative of the cross-tie grade are determined based on a crack density of one or more portions of a cross-tie.

Alternative Implementation 73. The system according to alternative implementation 72, wherein the one or more portions of the cross-tie include a first portion that is generally adjacent to a rail seat, a second portion that is generally equidistance between a first rail and a second rail, or both.

Alternative Implementation 74. The system according to implementation 67, wherein the first metric and the second metric are indicative of cross-tie plate-cutting.

Alternative Implementation 75. The system according to alternative implementation 74, wherein the first metric and the second metric indicative of the cross-tie plate-cutting are determined based on a width of an indentation in the one or more cross-ties.

Alternative Implementation 76. The system according to alternative implementation 67, wherein the first metric and the second metric are indicative of a cross-tie spacing distance.

Alternative Implementation 77. The system according to alternative implementation 67, wherein the first metric and the second metric are indicative of a cross-tie skew angle.

Alternative Implementation 78. The system according to alternative implementation 67, wherein the condition is a condition of the joints and welds of the railroad track.

Alternative Implementation 79. The system according to alternative implementation 78, wherein the first metric and the second metric are indicative of the presence or absence of joints, welds, or both, on the one or more rails of the railroad track at the first location and the second location.

Alternative Implementation 80. The system according to alternative implementation 67, wherein the condition is a condition of the switch of the railroad track.

Alternative Implementation 81. The system according to alternative implementation 80, wherein the first metric and the second metric are indicative of the presence or absence of the switch at the first location and the second location.

Alternative Implementation 82. The system according to any one of alternative implementations 66-82, wherein the one or more rails of the railroad track include a first running rail, a second running rail, and a conductor rail and the railroad includes a conductor rail cover configured to at least partially overlie a surface of the conductor rail.

Alternative Implementation 83. The system according to alternative implementation 82, wherein the first metric and the second metric are indicative of a distance between the cover and a surface of the conductor rail at the first location and the second location.

Alternative Implementation 84. The system according to alternative implementation 66, wherein the transportation pathway is a railroad including a railroad track having one or more rails and crossties.

Alternative Implementation 85. The system according to alternative implementation 84, wherein the condition is a drainage condition of the railroad track.

Alternative Implementation 86. The system according to alternative implementation 85, wherein the first metric and the second metric are indicative of the presence or absence of standing water at the first location and the second location.

Alternative Implementation 87. The system according to alternative implementation 67, wherein the condition is a condition of vegetation on or adjacent to the railroad track.

Alternative Implementation 88. The system according to alternative implementation 87, wherein the first metric and the second metric are indicative of a volume of the vegetation on or adjacent to the railroad track at the first location and the second location.

Alternative Implementation 89. The system according to alternative implementation 67, wherein the imaging device is a thermal imaging device configured to generate thermal image data reproducible as thermal images of the portions of the transportation pathway and the condition is a thermal condition of the railroad track.

Alternative Implementation 90. The system according to alternative implementation 89, wherein the first metric and the second metric are indicative of an average temperature, a maximum temperature, a minimum temperature, a standard deviation of temperature, or any combination therefor, for at least a portion of the railroad track at the first location and the second location.

Alternative Implementation 91. The system according to implementation 66, wherein the transportation pathway is a roadway.

Alternative Implementation 92. The system according to alternative implementation 91, wherein the condition is a condition of a surface of the roadway.

Alternative Implementation 93. The system according to alternative implementation 92, wherein the first metric and the second metric are indicative of a crack density of the surface of the roadway at the first location and the second location.

Alternative Implementation 94. The system according to any one of alternative implementations 91-93, wherein the imaging device is a thermal imaging device configured to generate thermal image data reproducible as thermal images of the portions of the transportation pathway and the condition is a thermal condition of the roadway.

Alternative Implementation 95. The system according to alternative implementation 94, wherein the first metric and the second metric are indicative of an average temperature, a maximum temperature, a minimum temperature, a standard deviation of temperature, or any combination therefor, for at least a portion of the railroad track at the first location and the second location.

Alternative Implementation 96. The system according to alternative implementation 91, wherein the condition is a drainage condition of the roadway.

Alternative Implementation 97. The system according to alternative implementation 96, wherein the first metric and the second metric are indicative of the presence or absence of standing water on the roadway at the first location and the second location.

Alternative Implementation 98. The system according to any one of alternative implementations 66-97, wherein the imaging device is coupled to a transport device configured to move along the transportation pathway.

Alternative Implementation 99. The system according to alternative implementation 98, wherein the memory device and one or more processors are coupled to the transport device.

Alternative Implementation 100. The system according to alternative implementation 99, further comprising a communication module configured to transmit the generated graph to a remote device that is not coupled to the transport device.

Alternative Implementation 101. The system according to alternative implementation 100, wherein the remote device is configured to display the generated graph.

Alternative Implementation 102. The system according to alternative implementation 101, wherein the remote device is configured to display a second graph indicative of a third metric and a fourth metric, the third metric and the fourth metric being indicative of the condition of the first portion and the second portion of the transportation pathway and having been determined prior to the first metric and the second metric.

One or more elements or aspects or steps, or any portion(s) thereof, from one or more of any of Alternative Implementations 1-102 above can be combined with one or more elements or aspects or steps, or any portion(s) thereof, from one or more of any of the other Alternative Implementations 1-102 or combinations thereof, to form one or more additional implementations and/or claims of the present disclosure.

While the present disclosure has been described with reference to one or more particular embodiments or implementations, those skilled in the art will recognize that many changes may be made thereto without departing from the spirit and scope of the present disclosure. Each of these implementations and obvious variations thereof is contemplated as falling within the spirit and scope of the present disclosure. It is also contemplated that additional implementations according to aspects of the present disclosure may combine any number of features from any of the implementations described herein.

What is claimed is:

1. A method of analyzing drainage of a transportation pathway, the method comprising:
    obtaining, using an imaging device of an inspection system, image data reproducible as a plurality of images of the transportation pathway, each of the plurality of images being reproducible as an image of a portion of the transportation pathway, each portion having an associated location along a length of the transportation pathway;
    analyzing, using one or more processors of the inspection system, the image data to identify a presence of standing water in each of the plurality of images of the transportation pathway;
    determining, based on the analyzing the image data, a plurality of metrics being indicative of a drainage conditions of the transportation pathway; and
    generating a graph using at least a portion of the determined plurality of metrics for visually illustrating the drainage condition at each of the associated locations.

2. The method of claim 1, wherein the analyzing includes determining an area of standing water in each of the plurality of images of the transportation pathway.

3. The method of claim 1, further comprising, responsive to analyzing the image data to identify the presence of standing water at a first location of the associated locations, overlaying a symbol on the graph at a position corresponding to the first location.

4. The method of claim 1 wherein the plurality of metrics includes a ratio of an area of standing water on the portion of the transportation pathway versus a total area of the portion of the transportation pathway.

5. The method of claim 1, wherein the transportation pathway is a railroad including one or more of running rails, conductor rails, conductor rail covers, cross-ties, ballast, joints, welds, fasteners, and switches.

6. The method of claim 1, wherein the imaging device and the one or more processors are coupled to a transport device configured to move along the transportation pathway.

7. The method of claim 1, further comprising:
calibrating the inspection system such that the one or more processors are configured to determine one or more distances within each of the plurality of images, the calibrating including:
obtaining, from the imaging device, a first image including an object having a known length;
analyzing the first image to determine a number of pixels associated with the known length of the object; and
based on the analyzing, assigning a distance to each pixel in the first image.

8. The method of claim 1, wherein the imaging device is a thermal imaging device, the thermal imaging device being configured to identify a temperature change along each portion of the transportation pathway, the temperature change being indicative of standing water on the portion of the transportation pathway.

9. The method of claim 1, wherein the analyzing includes identifying the presence or absence of ice in each of the plurality of images of the transportation pathway.

10. A system for analyzing drainage conditions of a transportation pathway, the system comprising:
an imaging device, wherein the imaging device is configured to obtain image data reproducible as a plurality of images of the transportation pathway, each of the plurality of images being reproducible as an image of a portion of the transportation pathway, each portion having an associated location along a length of the transportation pathway; and
a memory device, the memory device being configured to store machine readable instructions configured to be executed by one or more processors to cause the system to:
analyze, using one or more processors, the image data to identify a presence of standing water in each of the plurality of images of the transportation Pathway;
determine, based on analyzing the image data, a plurality of metrics being indicative of a drainage conditions of the transportation pathway; and
generate a graph using at least a portion of the plurality of metrics, wherein the graph illustrates the drainage condition at each of the associated locations.

11. The system of claim 10, wherein the transportation pathway is a railroad including one or more of running rails, conductor rails, conductor rail covers, cross-ties, ballast, joints, welds, fasteners, and switches.

12. The system of claim 10, wherein the instructions further cause the system to:
identify, based on the plurality of metrics, the presence of standing water in each of the plurality of images of the transportation pathway.

13. The system of claim 12, wherein the instructions further cause the system to:
determine, based on the plurality of metrics, an area of standing water in each of the plurality of images of the transportation pathway.

14. The system of claim 12, wherein the instructions further cause the system to:
overlay a symbol on the graph, the symbol being indicative of the presence of standing water at a first location of the associated locations of the transportation pathway.

15. The system of claim 10, wherein the plurality of metrics includes a ratio of an area of standing water on the portion of the transportation pathway versus a total area of the portion of the transportation pathway.

16. The system of claim 10, wherein the system is configured to be secured to a transport device configured to move along the transportation pathway.

17. The system of claim 10, wherein the imaging device is a thermal imaging device, the thermal imaging device being configured to identify a temperature change along each portion of the transportation pathway, the temperature change being indicative of standing water on the portion of the transportation pathway.

18. The system of claim 10, wherein the plurality of metrics is configured to identify the presence of ice in each of the plurality of images of the transportation pathway.

19. The system of claim 10, wherein the machine readable instructions further cause the system to:
calibrate the inspection system such that the one or more processors are configured to determine one or more distances within each of the plurality of images, wherein the inspection system is configured to:
obtain, from the imaging device, a first image, the first image includes an object having a known length;
analyze the first image to determine a number of pixels associated with the known length of the object;
assign a distance to each pixel in the first image based on the known length of the object.

20. The method of claim 2, further comprising comparing the area of standing water in a first of the plurality of images to the area of standing water in a second of the plurality of images to determine a largest area of standing water, wherein the largest area of standing water is indicative of a repair priority.

* * * * *